United States Patent
Ogata et al.

(10) Patent No.: US 6,663,794 B2
(45) Date of Patent: Dec. 16, 2003

(54) REDUCING-ATMOSPHERE-RESISTANT THERMISTOR ELEMENT, PRODUCTION METHOD THEREOF AND TEMPERATURE SENSOR

(75) Inventors: Itsuhei Ogata, Nishio (JP); Daisuke Makino, Nishio (JP); Kaoru Kuzuoka, Toyota (JP); Atsushi Kurano, Kuwana (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 09/924,596

(22) Filed: Aug. 9, 2001

(65) Prior Publication Data

US 2002/0088965 A1 Jul. 11, 2002

(30) Foreign Application Priority Data

Aug. 10, 2000 (JP) ......................... 2000-242104

(51) Int. Cl.[7] ................. H01C 7/02; C04B 35/00; C04B 35/50; G01K 7/22
(52) U.S. Cl. ............... 252/62.3; 252/518.1; 252/520.2; 252/520.5; 338/22 R; 338/22 SD; 29/610.1; 29/612; 264/614; 264/618; 423/605; 423/606
(58) Field of Search ................ 252/62.3, 502, 252/518.1, 520.2, 520.5; 338/22 R, 22 SD; 29/610.1; 264/405, 425, 473, 488, 614, 618; 423/595, 598, 599, 605, 606

(56) References Cited

U.S. PATENT DOCUMENTS 5,815,063 A * 9/1998 Goto et al. ............... 338/22 R
6,143,207 A * 11/2000 Yamada et al. .......... 252/518.1
6,164,819 A   12/2000 Moriwake et al.

FOREIGN PATENT DOCUMENTS

| DE | 19908444 A1 | * | 9/1999 | ............ H01C/7/04 |
| JP | 51042989 A  | * | 4/1976 | ............ C04B/35/46 |
| JP | 6-325907    |   | 11/1994 | |
| JP | 7-78703     |   | 3/1995 | |
| JP | 7-211511    |   | 8/1995 | |
| JP | 9-69417     |   | 3/1997 | |
| JP | 10-70008    |   | 3/1998 | |

* cited by examiner

Primary Examiner—Yogendra N. Gupta
Assistant Examiner—Kallambella Vijayakumar
(74) Attorney, Agent, or Firm—Harness, Dickey & Pierce, PLC

(57) ABSTRACT

This invention provides a reducing-atmosphere-resistant thermistor element, the resistance of which does not greatly change even when the element is exposed to a reducing atmosphere, and which has high accuracy and exhibits excellent resistance value stability. The thermistor element has a construction in which an oxygen occlusion-release composition, having oxygen occlusion-release characteristics, such as $CeO_2$ is dispersed in a composition containing a mixed sintered body $(M1\ M2)O_3 \cdot AO_x$ as a principal component. The oxygen occlusion-release composition emits absorbed oxygen in a reducing atmosphere and suppresses migration of oxygen from the composition constituting the element. Therefore, the resistance value does not greatly change even when the element is exposed to a reducing atmosphere, and the element can accurately detect the temperature for a long time. The present invention can thus provide a temperature sensor having high reliability.

19 Claims, 15 Drawing Sheets

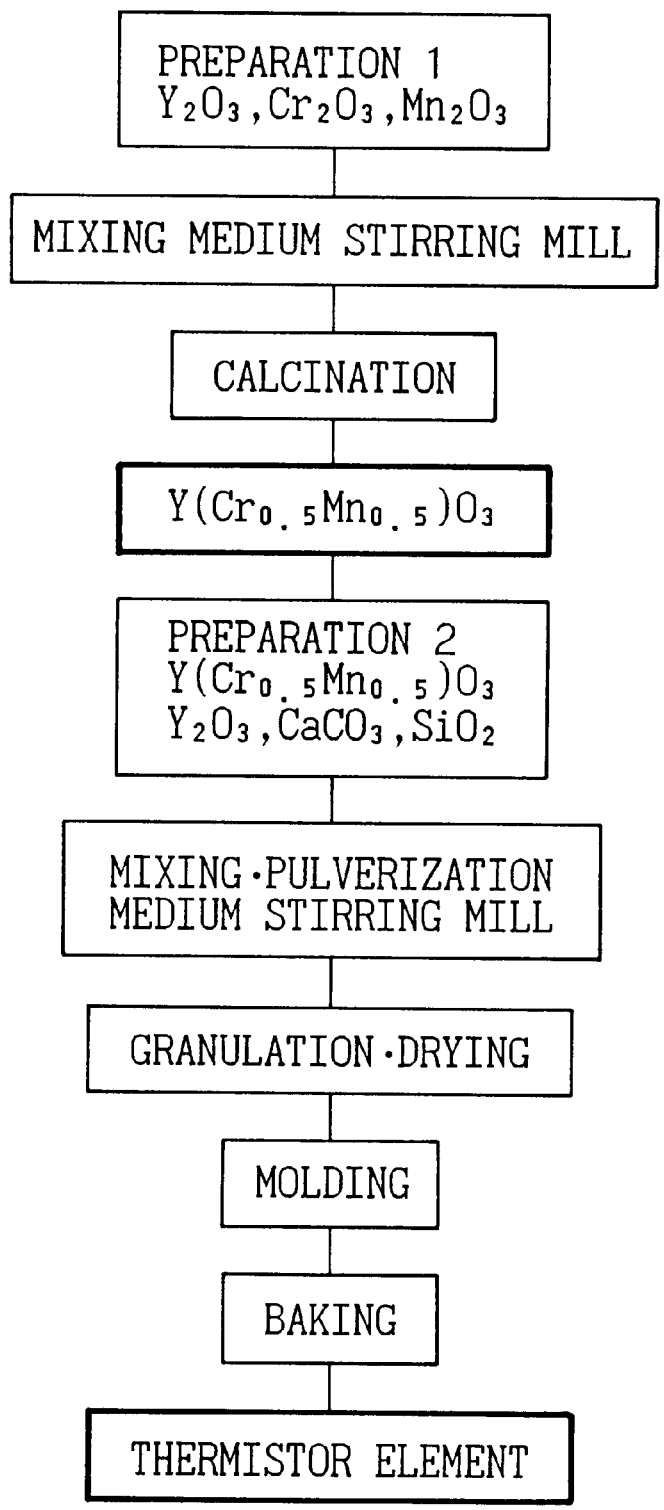

REDUCING-ATMOSPHERE-RESISTANT THERMISTOR ELEMENT, PRODUCTION METHOD THEREOF AND TEMPERATURE SENSOR

BACKGROUND OF THE INVENTION

1. Field of the Invention

This invention relates to a reducing-atmosphere-resistant thermistor element capable of accurately detecting a temperature in a broad temperature range and having stable characteristics even in a reducing atmosphere, and a production method of such a thermistor element. The present invention is particularly suitable for use in temperature sensors for automobile exhaust gases.

2. Description of the Related Art

Thermistor elements for temperature sensors have been used for measuring temperatures in medium and high temperature ranges of about 400 to 1,300° C. such as the temperatures of automobile exhaust gases, the gas flame temperatures of gas hot water supply systems, the temperatures of heating furnaces, and so forth. The characteristics of the thermistor elements of this kind are generally represented by a resistance value and a resistance-temperature coefficient (temperature dependence of the resistance value). To provide a practical resistance value to a temperature detection circuit constituting the temperature sensor, the resistance value of the thermistor element must remain within a predetermined range (100Ω to 100 kΩ within an ordinary use temperature range, for example). Perovskite type composite oxide materials have been used mainly as the materials having resistance value characteristics suitable for the thermistor element.

Japanese Unexamined Patent Publication (Kokai) No. 6-325907, for example, discloses a thermistor element using peroviskite type materials. To provide a thermistor element that can be used over a broad temperature range, this reference teaches to mix oxides of Y, Sr, Cr, Fe, Ti, etc, in a predetermined composition ratio and to bake the mixture to obtain a thermistor element that is in a completely solid-solution state. The reference describes that this thermistor exhibits stable characteristics in a high temperature range.

In temperature sensors for automobile exhaust gases, a metal case covers a thermistor element, as a sensing element, at the distal end of the temperature sensor to prevent deposition of dust and soot from the exhaust gases. When the exhaust gas reaches a high temperature of around 900° C., however, the metal case is thermally oxidized by the heat of the high temperature exhaust gas, and the internal atmosphere of the metal case is likely to change to a reducing atmosphere. In consequence, a problem develops in that oxides constituting the thermistor element are reduced and the resistance value changes.

To cope with this problem, the temperature sensor is generally placed into an electric furnace and is subjected to thermal aging treatment at 900 to 1,000° C. for about 100 hours to stabilize the resistance value. However, if any hole appears in the metal case or the exhaust gas enters the case due to loosening of the case, during use, of the temperature and the thermistor element is exposed to the reducing atmosphere, the resistance value is likely to change as described above. In recent engine control systems, the temperature sensor is often mounted at a position closer to the engine that generates the high-temperature exhaust gas. Therefore, an exhaust gas having a high temperature (e.g. 1,100 to 1,200° C.) reaches the temperature sensor. During the thermal aging treatment at 900 to 1,000° C., there is the possibility that the metal case is re-oxidized depending on the operation mode of the engine, the thermistor element is again reduced, and the resistance value changes. In other words, a thermal aging treatment cannot completely solve the problem. In addition, the number of production steps increases and invites an increase in the cost of production of in temperature sensor.

On the other hand, Japanese Unexamined Patent Publication (Kokai) No. 9-69417 describes a technology that shapes a metal case by machining a specific metal material such as an alloy consisting of Ni—Cr—Fe as a principal component, suppresses the change of the atmosphere inside the case and minimizes the resistance value change of a thermistor element. However, when the metal case is made of the specific metal material, the material cost and the machining cost increase. Further, the problem of the resistance change when the thermistor element itself is exposed to the reducing atmosphere remains to be solved.

As described above, a thermistor element that exhibits stable resistance value characteristics even under the condition where the internal atmosphere of the metal case of the temperature sensor becomes a reducing atmosphere is not available.

SUMMARY OF THE INVENTION

In view of the problems described above, the present invention aims at economically providing a reduction-resistant thermistor element the resistance value of which does not greatly change even when the thermistor element is exposed to a reducing atmosphere, and which has high accuracy and excellent resistance value stability.

To solve the problems, the inventors of the present invention have conducted intensive studies and have discovered that when an oxygen occlusion-release composition is added to, and dispersed in, a composition constituting a thermistor element so as to provide the thermistor element with a function of occluding and releasing oxygen in accordance with an environment, migration of oxygen from the thermistor element can be limited and the resistance change can be suppressed in the reducing atmosphere.

The invention according to claim 1 is completed on basis of the finding described above. The thermistor element of this invention is characterized by a construction which consists of a metal oxide sintered body as a principal component, and in which an oxygen occlusion-release composition having oxygen occlusion-release characteristics is dispersed in the metal oxide sintered body.

As the thermistor element according to the present invention has a construction in which the oxygen occlusion-release composition is dispersed in the metal oxide sintered body having thermistor characteristics. Therefore, when the internal atmosphere of the metal case becomes a reducing atmosphere, the oxygen occlusion-release composition emits absorbed oxygen and prevents migration of oxygen from the metal oxide sintered body. In consequence, the thermistor element can prevent fluctuation of the composition resulting from the reduction of the metal oxide sintered body and the resistance change resulting from the former, and can improve resistance value stability.

As described above, the thermistor element according to the present invention has reducing-atmosphere-resistance and its resistance value does not greatly change even when it is exposed to the reducing atmosphere. Therefore, the thermistor element can accurately detect the temperature for a long time, and can provide a temperature sensor having high reliability. Since the metal case need not be made of a specific metal material and a thermal aging treatment is not necessary, either, the production cost can be reduced.

According to a second aspect of the present invention, there is provided a reducing-atmosphere-resistant thermistor element wherein the oxygen occlusion-release composition is an oxide containing at least one metal oxide selected from the group consisting of Ce, Pr and Tb.

According to a third aspect of the present invention, there is provided a occlusion-release thermistor element, as described above, wherein the oxygen occlusion-release composition is at least one oxide selected from the group consisting of $CeO_2$, $Pr_6O_{11}$, $Tb_4O_7$, $2CeO_2 \cdot Y_2O_3$ and $CeO_2 \cdot ZrO_2$. Since these oxides have the function of occluding and releasing oxygen in accordance with the environment, the reducing-atmosphere-resistance of the thermistor element can be drastically improved when these oxides are added and dispersed.

According to a fourth aspect of the present invention, there is provided a reducing-atmosphere-resistant thermistor element, wherein a starting material of the oxygen occlusion-release composition is ultra-fine particles having a mean particle diameter of not greater than 100 nm. When the ultra-fine particles are used, the particles can be dispersed more uniformly into the metal oxide sintered body constituting the thermistor element, and reducing-atmosphere-resistance can be highly improved.

According to a fifth aspect of the present invention, there is provided a reducing-atmosphere-resistant thermistor element, wherein an addition amount of the oxygen occlusion-release composition is 1 to 95 mol % on the basis of the total molar amount (100%) of the metal oxide sintered body and the oxygen occlusion-release composition. The reducing-atmosphere-resistance improving effect due to occlusion and release of oxygen can be effectively obtained within this range.

According to a sixth aspect of the present invention, there is provided a reducing-atmosphere-resistant thermistor element, wherein the metal oxide sintered body has negative thermistor characteristics. The present invention preferably uses a thermistor element having linear negative characteristics (the resistance value decreases with the increase of the temperature) with respect to the absolute temperature. Such a thermistor element is useful as a temperature sensor. The effect of the present invention is high particularly in vehicles, etc, because the thermistor element is likely to be exposed to the reducing atmosphere.

According to a seventh aspect of the present invention, there is provided a reducing-atmosphere-resistant thermistor element wherein the metal oxide sintered body is a mixed sintered body (M1 M2)$O_3$.$AO_x$ of a composite oxide expressed by (M1 M2)$O_3$ and a metal oxide expressed by $AO_x$. M1 in the composite oxide (M1 M2)$O_3$ is at least one kind of element selected from the group consisting of the Group 2A and the Group 3A with the exception of La of the Periodic Table, M2 is at least one kind of element selected from the group consisting of the Groups 3B, 4A, 5A, 6A, 7A and 8, the metal oxide $AO_x$ has a melting point of not lower than 1,400° C., and a resistance value (at 1,000° C.) of the $AO_x$ single substance is at least 1,000Ω in a thermistor form.

For temperature sensors used in a wide temperature range, it is advisable to use a mixed sintered body of a composite oxide (M1 M2)$O_3$ of a perovskite structure having relatively low resistance value characteristics within a temperature range of from room temperature to 1,000° C., and a metal oxide $AO_x$ having a high resistance value and a high melting point. Since the metal oxide $AO_x$ has a high resistance value, it can increase the resistance value of the mixed sintered body in the high temperature range. Since it has a high melting point and is excellent in heat resistance, it can improve the high temperature stability of the thermistor element. In this way, it is possible to obtain a wide-range type thermistor element the resistance value of which is within a range of 100Ω to 100 kΩ in a temperature range of from room temperature to 1,000° C., and which has a small change of the resistance value due to heat history, etc, and is excellent in stability.

According to an eighth aspect of the present invention, there is provided a reducing-atmosphere-resistant thermistor element wherein, when a molar fraction of the composite oxide (M1 M2)$O_3$ in the mixed sintered body is a and a molar fraction of the metal oxide $AO_x$ is b, a and b satisfy the relation $0.05 \leq a < 1.0$, $0 < b \leq 0.95$ and $a+b=1$. When the molar fractions a and b satisfy these relation, the effects described above (the resistance value within the predetermined range and resistance value stability) can be accomplished more reliably.

Because the molar fractions can be varied in a broad range as described above, the resistance value and the resistance-temperature coefficient can be variously controlled with a broad range by appropriately mixing and baking (M1 M2)$O_3$ and $AO_x$.

According to a ninth aspect of the present invention, there is provided a reducing-atmosphere-resistant thermistor element wherein M1 in the composite oxide (M1 M2)$O_3$ is at least one kind of element selected from the group Mg, Ca, Sr, Ba, Y, Ce, Pr, Nd, Sm, Eu, Gd, Tb, Dy, Ho, Yb and Sc, and M2 is at least one kind of element selected from the group consisting of Al, Ga, Ti, Zr, Hf, V, Nb, Ta, Cr, Mo, W, Mn, Tc, Re, Fe, Co, Ni, Ru, Rh, Pd, Os, Ir and Pt.

According to an eleventh embodiment of the present invention, at least one metal oxide is selected as the concrete metal oxide $AO_x$ from the group consisting of MgO, $Al_2O_3$, $SiO_2$, $Sc_2O_3$, $TiO_2$, $Cr_2O_3$, MnO, $Mn_2O_3$, $Fe_2O_3$, $Fe_3O_4$, NiO, ZnO, $Ga_2O_3$, $Y_2O_3$, $ZrO_2$, $Nb_2O_5$, $SnO_2$, $CeO_2$, $Pr_2O_3$, $Nd_2O_3$, $Sm_2O_3$, $Eu_2O$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $HfO_2$, $Ta_2O_5$, $2MgO \cdot 2SiO_2$, $MgSiO_3$, $MgCr_2O_4$, $MgAl_2O_4$, $CaSiO_3$, $YAlO_3$, $Y_3Al_5O_{12}$, $Y_2SiO_5$ and $3Al_2O_3 \cdot 2SiO_2$. All these metal oxides have a high resistance value and high heat resistance and contribute to an improvement in the performance of the thermistor element.

According to a twelfth aspect of the present invention, M1 in the composite oxide (M1 M2)$O_3$ is Y, M2 is Cr and Mn, A in the metal oxide $AO_x$ is Y, and the mixed sintered body (M1 M2)$O_3$.$AO_x$ is Y(CrMn)$O_3$.$Y_2O_3$. This mixed sintered body is suitably used for temperature sensors, etc, and exhibits high performance in a wide temperature range.

According to a thirteenth aspect of the present invention, a sintering assistant is added to the mixed sintered body (M1 M2)$O_3$.$AO_x$ to improve sintering property of each particle. At least one of CaO, $CaCO_3$, $SiO_2$ and $CaSiO_3$ is used as a sintering assistant, and a thermistor element having a high sintering density can be obtained.

According to a fourteenth aspect of the present invention, there is provided a method of producing a reducing-atmosphere-resistant thermistor element consisting of a metal oxide sintered body as a principal component, comprising the steps of mixing and pulverizing a raw material powder containing the metal, heat treating the mixture and obtaining a thermistor composition made of an oxide containing the metal; mixing and pulverizing the thermistor composition and an oxygen occlusion-release composition having oxygen occlusion-release characteristics to prepare a composite raw material containing the oxygen occlusion-release composition dispersed in the thermistor composition; and molding the composite raw material into a predetermined shape and baking the resulting molded article.

As a result of studies of production processes for improving the reducing-atmosphere resistance of the thermistor element, the present inventors have found that it is important to add and uniformly disperse the oxygen occlusion-release composition into the metal oxide sintered body constituting the thermistor element. Therefore, after the thermistor composition that is to function as the raw material of the metal oxide sintered body is prepared, the oxygen occlusion-release composition is mixed and pulverized, and the thermistor element is obtained through molding and baking. In this way, there is provided a reducing-atmosphere-resistant thermistor element that has resistance stability even in a reducing atmosphere.

According to a fifteenth aspect of the present invention, the raw material powder used in the fourteenth aspect is powder having a mean particle diameter of not greater than 100 nanometers. The composition prepared by mixing, pulverizing and heat treating raw material powder of ultra-fine particles having a mean particle diameter of not greater than 100 nanometers has small variance of the composition, reduces variance of the resistance of the thermistor element and further improves the temperature accuracy.

According to a sixteenth aspect of the present invention, there is provided another method, of producing a reducing-atmosphere thermistor element, comprising the steps of mixing a precursor compound of the metal oxide into a liquid phase to prepare a precursor solution, heat treating the precursor solution and obtaining a thermistor composition containing the metal oxide; mixing and pulverizing the thermistor composition and an oxygen occlusion-release composition having oxygen occlusion-release characteristics to prepare a composite raw material containing the oxygen occlusion-release composition dispersed in the thermistor composition; and molding the composite raw material into a predetermined shape and baking the resulting molded article.

When the thermistor composition as the principal component of the thermistor element is prepared, the present invention uses a solution containing a precursor compound of the metal oxide described above and heat-treats the solution to obtain the thermistor composition. In this way, the present invention can provide a thermistor composition having a reduced variance in resistance and an improved temperature accuracy. The oxygen occlusion-release composition is mixed and pulverized into the resulting thermistor composition in the same way as described above, and the thermistor element containing the oxygen occlusion-release composition that is uniformly dispersed provides a similar effect in the same way as described above.

According to a seventeenth aspect of the present invention, there is provided another method, of producing a reducing-atmosphere-resistant thermistor element, comprising the steps of mixing a precursor compound of the metal oxide into a liquid phase and preparing a first precursor solution; mixing a precursor compound of an oxygen occlusion-release composition having oxygen occlusion-release characteristics into a liquid phase and preparing a second precursor solution; mixing the first and second precursor solutions and preparing a mixed precursor solution of the metal oxide and the oxygen occlusion-release composition; heat treating the mixed precursor solution and preparing a composite raw material containing the oxygen occlusion-release composition dispersed in the thermistor composition containing the metal oxide; and molding the composite raw material into a predetermined shape and baking the resulting molded article.

When the composite raw material described above is prepared, it is also possible to employ a method that separately prepares the precursor solutions of the metal oxide and the oxygen occlusion-release composition, mixes these solutions to obtain a mixed precursor solution and heat treats the mixed precursor solution. When mixing is done in the solution form, uniform mixing can be made more easily, and a thermistor element in which the oxygen occlusion-release composition is uniformly dispersed can be obtained.

According to an eighteenth aspect of the present invention, there is provided another method, of producing a reducing-atmosphere-resistant thermistor element, comprising the steps of mixing a precursor compound of the metal oxide described above into a liquid phase to prepare a precursor solution, mixing an oxygen occlusion-release composition having oxygen occlusion-release characteristics into the precursor solution and preparing a mixed precursor solution containing the oxygen occlusion-release composition dispersed therein; heat treating the mixed precursor solution and preparing a composite raw material containing the oxygen occlusion-release composition dispersed in the thermistor composition containing the metal oxide; and molding the composite raw material into a predetermined shape and baking the resulting molded article.

When the thermistor composition as the principal component of the thermistor element is prepared, the present invention uses the solution containing the precursor compound of the metal oxide and adds the oxygen occlusion-release composition. In this way, the present invention can mix them easily, and can obtain the thermistor element having the oxygen occlusion-release composition uniformly dispersed therein.

According to a nineteenth aspect of the present invention, there is provided another method, of producing a reducing-atmosphere-resistant thermistor element, comprising the steps of obtaining a mixture by mixing and pulverizing raw material powder containing the metal described above; causing the mixture to be impregnated with a precursor solution of an oxygen occlusion-release composition having oxygen occlusion-release characteristics; heat treating the mixture impregnated with the precursor solution of the oxygen occlusion-release composition and preparing a composite raw material containing the oxygen occlusion-release composition dispersed in the thermistor composition containing the metal oxide; and molding the composite raw material into a predetermined shape and baking the resulting molded article.

When the composite raw material described above is prepared, it is also possible to employ a method that prepares a precursor solution of the oxygen occlusion-release composition described above, causes the raw material mixture of the metal oxide to be impregnated with the precursor solution, and heat treats the solution. Since mixing is conducted in the solution form, uniform mixing can be done easily, and the thermistor element containing the oxygen occlusion-release composition uniformly dispersed therein can be obtained.

According to a twentieth aspect of the present invention, the oxygen occlusion release composition or its starting material is ultra-fine particles having a mean particle diameter of not greater than 100 nanometers. When the ultra-fine particles are used, the oxygen occlusion-release composition can be uniformly dispersed, and the resistance stability of the thermistor element can be improved.

According to a twenty-first aspect of the present invention, there is provided a temperature sensor comprising the reducing-atmosphere-resistant thermistor element according to the first or thirteenth aspect of the present invention. The thermistor element having the construction of any of the aspects described above can detect the temperature over a broad range and has stable resistance value characteristics. Therefore, it is possible to provide a temperature sensor having high performance and excellent reduction resistance.

BRIEF DESCRIPTION OF THE DRAWINGS

FIG. 16 is a production flowchart of a thermistor element according to Comparative Example 1.

DESCRIPTION OF THE PREFERRED EMBODIMENTS

Figure 1:
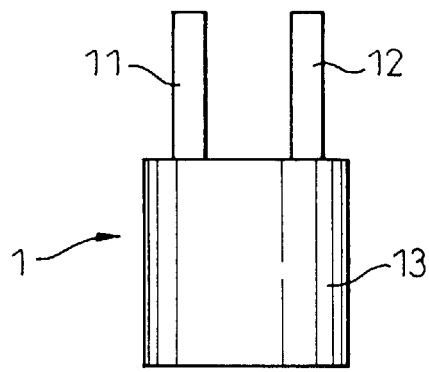
FIG. 1 is an overall schematic view of a thermistor element to which the present invention is applied.

The present invention will be hereinafter described in detail. The reducing-atmosphere-resistant thermistor element according to the present invention is a thermistor element that contains a metal oxide sintered body as its principal component, and is characterized in that an oxygen occlusion-release composition having oxygen occlusion-release characteristics is appropriately dispersed in the metal oxide sintered body. The metal oxide sintered body preferably has linear negative characteristics (a decreasing resistance value with the increase of a temperature) with respect to the absolute temperature, and is prepared to provide desired thermistor characteristics by a later-appearing method.

The oxygen occlusion-release composition is an oxide containing at least one metal element selected from the group consisting of Ce (cerium), Pr (praseodymium) and Tb (terbium). More concretely, it is possible to use at least one kind of oxide selected from the group consisting of $CeO_2$ (cerium oxide), $Pr_6O_{11}$ (praseodymium oxide), $Tb_4O_7$ (terbium oxide), $2CeO_2 \cdot Y_2O_3$ (cerium.yttrium composite oxide) and $CeO_2 \cdot ZrO_2$ (cerium.zirconium composite oxide). It is appropriate to use at least one kind of oxide selected from the group consisting of $CeO_2$, $Pr_6O_{11}$ and $Tb_4O_7$ each having a mean particle diameter of not greater than 100 nm, or $2CeO_2 \cdot Y_2O_3$ and $CeO_2 \cdot ZrO_2$ synthesized from $CeO_2$ and $Y_2O_3$ or $ZrO_2$ each having a mean particle diameter of not greater than 100 nm. When the ultra-fine particles having a mean particle diameter of not greater than 100 nm are used, uniform dispersion into the matrix of the thermistor element can be easily attained, and resistance value stability can be improved.

The addition amount of the oxygen absorption-emission composition is preferably 1 to 95 mol % with respect to the total molar amount (100 mol %) of the metal oxide sintered body and the oxygen absorption-emission composition. When the amount is smaller than 1 mol %, a sufficient effect of improving the resistance value stability of the thermistor element in a reducing atmosphere cannot be obtained. When the addition amount exceeds 95 mol %, the resistance value at room temperature becomes so high that the desired characteristics of the thermistor element cannot be obtained.

The metal oxide sintered body that constitutes the reducing-atmosphere-resistant thermistor element of the present invention appropriately consists of a mixed sintered body (M1 M2)$O_3 \cdot AO_x$ that is prepared by mixing a composite oxide expressed by (M1 M2)$O_3$ and a metal oxide expressed by $AO_x$, and by sintering the resulting mixture. Here, the composite oxide (M1 M2)$O_3$ is a composite oxide having a perovskite structure, whereby M1 is at least one kind of elements selected from the Group 2A and Group 3A exclusive of La, of the Periodic Table, and M2 is at least one kind of elements selected from the Groups 3B, 4A, 5A, 6A, 7A and 8 of the Periodic Table. Here, because La has high hygroscopicity, it forms an unstable hydroxide upon reaction with the moisture in the open air and destroys the thermistor element. Thus La is not used as M1.

More concretely, the element of the Group 2A to serve as M1 is selected from Mg, Ca, Sr and Ba, and the element of the Group 3A to serve as M1 is selected from Y, Ce, Pr, Nd, Sm, Eu, Gd, Tb, Dy, Ho, Er, Yb and Sc. The element of the Group 3B as M2 is selected from Al and Ga, and the element of the Group 4A to serve as M2 is selected from Ti, Zr and Hf. The element of the Group 5A to serve as M2 is selected from V, Nb and Ta and the element of the Group 6A as M2 is selected from Cr, Mo and W. The element of the Group 7A as M2 is selected from Mn, Tc and Re, and the element of the Group 8 as M2 is selected from Fe, Co, Ni, Ru, Rh, Pd, Os, Ir and Pt.

M1 and M2 can be combined in an arbitrary way so as to obtain desired resistance value characteristics. A composite oxide (M1M2)$O_3$ obtained by appropriately selecting these M1 and M2 exhibits a low resistance value and a low resistance temperature coefficient (at, for example, 1,000 to 4,000 (K)). For example, Y(Cr, Mn)$O_3$ can be used as such a composite oxide (M1 M2)$O_3$. When a plurality of elements is selected for M1 or M2, the molar ratio of each element can be suitably selected in accordance with desired resistance value characteristics.

However, when the composite oxide (M1 M2)$O_3$ is used alone as the thermistor material, stability of the resistance value is not sufficient. Furthermore, the resistance value in a high temperature zone is likely to drop. Therefore, to stabilize the resistance value of the thermistor element and to keep it within a desired range, the present invention uses a metal oxide $AO_x$. The properties required for the metal oxide $Ao_x$ are that ① it has a high resistance value in a high temperature zone, and ② it is excellent in heat resistance and is stable at high temperatures. More concretely, as to ①, the resistance value of the $AO_x$ single substance (not containing (M1M2)$O_3$) is at least 1,000° C. and as to ②, the melting point is at least 1,400° C. and is sufficiently higher than the 1,000° C. that is the highest ordinary use temperature of the sensor.

To satisfy the requirements ① and ②, at least one element selected from the group consisting of B, Mg, Al, Si, Ca, Sc, Ti, Cr, Mn, Fe, Ni, Zn, Ga, Ge, Sr, Y, Zr, Nb, Sn, Ce, Pr, Nd, Sm, Eu, Gd, Tb, Dy, Ho, Er, Tm, Yb, Lu, Hf and Ta is suitably used as the metal element A in the metal oxide $AO_x$. More concretely, it is possible to use, as the metal oxide $AO_x$, at least one of the metal oxides selected from the group consisting of MgO, $Al_2O_3$, $SiO_2$, $Sc_2O_3$, $TiO_2$, $Cr_2O_3$, MnO, $Mn2O_3$, $Fe_2O_3$, $Fe_3O_4$, NiO, ZnO, $Ga_2O_3$, $Y_2O_3$, $ZrO_2$, $Nb_2O_5$, $SnO_2$, $CeO_2$, $Pr_2O_3$, $Nd_2O_3$, $Sm_2O_3$, $Eu_2O$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $HfO_2$, $Ta_2O_5$, $2MgO.2SiO_2$, $MgSiO_3$, $MgCr_2O_4$, $MgAl_2O_4$, $CaSiO_3$, $YAlO_3$, $Y_3Al_5O_{12}$, $Y_2SiO_5$ and $3Al_2O_3.2SiO_2$.

A suitable example of the metal oxide $AO_x$ that has a high resistance value and is excellent in the heat resistance is $Y_2O_3$. When Y is selected for M1 and Cr and Mn are selected for M2 in the composite oxide (M1 M2)$O_3$, the mixed sintered body (M1 M2)$O_3.AO_x$ is expressed by Y(CrMn)$O_3.Y_2O_3$. The thermistor element made of this mixed sintered body can be suitably used for the temperature sensor, etc, and can exhibit high performance in a broad temperature range.

Next, the molar ratios of the composite oxide (M1 M2)$O_3$ and the metal oxide $AO_x$ in the mixed sintered body (M1 M2)$_3.AO_x$ will be explained. When the molar fraction of the composite oxide (M1 M2)$O_3$ is a and the molar fraction of the metal oxide $AO_x$ is b, these a and b preferably satisfy the relation $0.05 \leq a < 1.0$, $0 < b \leq 0.95$ and $a+b=1$ in the present invention. When a and b are suitably selected within these ranges, a desired low resistance value and a low resistance temperature coefficient can be achieved. Since a and b can be varied over the broad range, the resistance value characteristics can be variously controlled in a wide range.

The mixed sintered body may contain at least one of CaO, $CaCO_3$, $SiO_2$ and $CaSiO_3$ as a sintering assistant. These sintering assistants have the effects of forming a liquid phase at the sintering temperature of the mixture of the composite oxide (M1 M2)$O_3$ and the metal oxide $AO_x$, and promoting sintering. Consequently, the sintering density of the resulting mixed sintered body can be improved, the resistance value of the thermistor element can be stabilized, and variance in the resistance value with the fluctuation of the sintering temperature can be reduced. The addition amounts of these sintering assistants can be suitably adjusted with their kind.

Figure 2A:
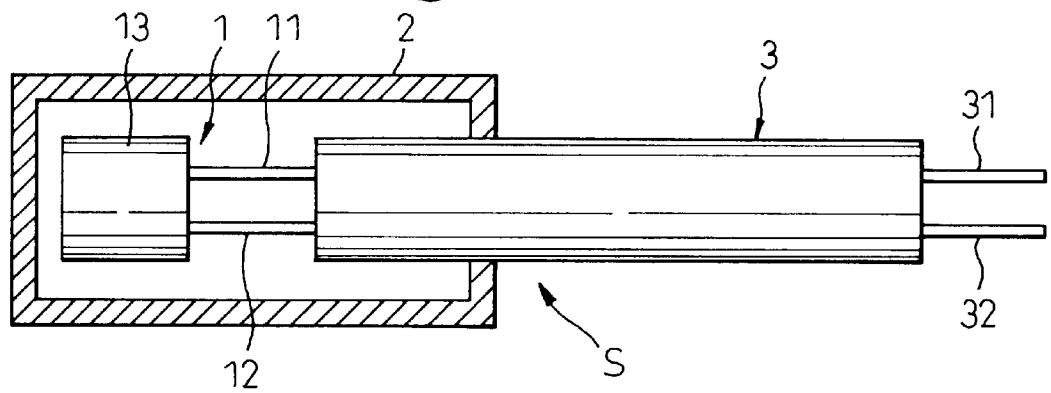
FIG. 2(A) is an overall schematic view of the temperature sensor having the built-in thermistor element according to the present invention.
Figure 2B:
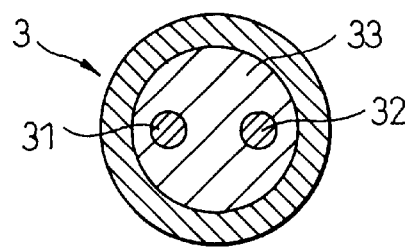
FIG. 2(B) is a sectional view of FIG. 1(A)

FIGS. 1, 2(A) and 2(B) show an example of a thermistor element 1 and an example of a temperature sensor S using the thermistor element 1. As shown in FIG. 1, the thermistor element 1 includes two parallel lead wires 11 and 12 one end of each of which is buried into an element portion 13. The mixed sintered body described above is shaped into a shape of a circular cylinder having an outer diameter of 1.60 mm, for example, to form the element portion 13. This thermistor element 1 is assembled into an ordinary sensor assembly shown in FIGS. 2(A) and 2(B) to constitute a temperature sensor S. The temperature sensor S has a cylindrical heat-resistant metal case 2 as shown in FIG. 2(A), and the thermistor element 1 is disposed in the left half portion of this case 2. One of the ends of a metal pipe 3 extending from the outside is situated in the right half portion of the metal case 2. The metal pipe 3 therein holds lead wires 31 and 32 as shown in FIG. 2(B). These lead wires 31 and 32 penetrate through the metal pipe 3, extend into the metal case 2 and are connected to the lead wires 11 and 12 of the thermistor element 1, respectively (FIG. 2(A)). The lead wires 11 and 12 have a wire diameter of 0.3 mm and a length of 5.0 mm, for example, and are made of Pt100 (pure platinum). Incidentally, magnesia powder 33 is packed into the metal pipe 3 to secure insulation of the lead wires 31 and 32 inside the metal pipe 3 as shown in FIG. 2(B).

Next, a method of producing the thermistor element 1 will be explained using a basic production method (1) and production methods (2) to (6) in which a part of the process steps of the basic production method is changed. In these production methods, the forms of starting materials and preparation methods of thermistor raw materials are changed. However, each production method includes the step of mixing the raw materials of the metal oxide sintered body as the principal component with the raw materials of the oxygen occlusion-release composition, the step of obtaining a composite raw material in which the oxygen occlusion-release composition is dispersed, and the step of shaping and sintering the composite raw material.

In the basic production method (1), powders of metal elements as the raw materials of M1, M2 and A in the mixed sintered body (M1 M2)$O_3.AO_x$ is first prepared and is mixed (preparation 1 step). Next, a dispersant such as water is added to this preparation. After the mixture is mixed and pulverized by a medium stirring mill, or the like, drying is conducted to obtain mixed powder (mixing step). This mixed powder is heat treated to obtain a (M1 M2)$O_3.AO_x$ thermistor composition (calcining step). The heat treatment temperature is generally from 1,000 to 1,500° C. Incidentally, a binder may be added during the mixing step to make the composition uniform, and heat treatment can be carried out more than twice. Compounds other than the oxides can be used as the raw materials of M1, M2 and A.

An oxygen occlusion-release composition having oxygen occlusion-release characteristics, a sintering assistant, etc, are mixed at predetermined ratios with this thermistor composition (M1 M2)$O_3.AO_x$ (preparation 2 step). It is also possible to prepare the composite oxide (M1 M2)$O_3$ at the preparation 1 step and then to add $AO_x$ at the preparation 2 step to obtain a desired composition. Next, the thermistor composition and the oxygen occlusion-release composition are mixed and pulverized by using a medium stirring mill, or the like, to obtain a mixed slurry containing the oxygen occlusion-release composition that is dispersed in the thermistor composition (mixing/pulverization step). This mixed slurry is pulverized and dried by using a spray dryer, or the like (granulation/drying step), is molded into a predetermined shape with lead wires of Pt, etc, assembled therein (molding step), and is thereafter baked to give a reducing-atmosphere-resistant thermistor element made of (M1 M2)$O_3.AO_x$ containing the oxygen occlusion-release composition uniformly dispersed therein (baking step). The baking temperature in the baking step is generally from about 1,400 to about 1,700° C.

In the molding step, it is possible either to conduct molding by use of a mold into which the lead wires are inserted in advance, or to bore holes for fitting the lead wires after molding, and to conduct baking after the lead wires are fitted. Alternatively, it is further possible to add and mix a binder, a resin material, etc, with the raw materials of the thermistor, to conduct extrusion molding at a suitable viscosity and a suitable hardness thereby to obtain a molded article of the thermistor element having the holes for fitting the lead wires, and to conduct baking after the lead wires are fitted. In this way, the thermistor element having the lead wires can be obtained.

In the basic production method (1) described above, the production method (2) uses powder having a mean particle diameter of not greater than 100 nm (nanometer) as the starting material of (M1 M2)$O_3$.A$O_x$ used in the preparation 1 step or the preparation 2 step. When powder having a mean particle diameter of not greater than 100 nm (nanometer) is used as the starting material of the mixed sintered body (M1 M2)$O_3$.A$O_x$, it becomes possible to obtain a uniform mixture, to reduce variance of the composition and to improve performance of the thermistor element. Sol particles having a mean particle diameter of not greater than 100 nm, for example, can be used as such raw material powder. Each of the preparation steps, the mixing step and the calcining step of the raw material powder are the same as those of the basic production method (1). The oxygen occlusion-release composition is added to the resulting thermistor composition, and is thereafter mixed, pulverized, granulated, dried, molded and baked similarly to give a reduction-resistant thermistor element having a uniform composition and small variance of the resistance value.

The production method (3) is different from the basic production method (1) in the preparation method of the thermistor composition. In other words, a precursor compound of (M1 M2)$O_3$.A$O_x$ is mixed in the liquid phase to prepare a precursor solution. This precursor solution is then heat treated to give a thermistor composition containing (M1 M2)$O_3$.A$O_x$. When a mixed solution of the M1, M2 and A compounds and a complex forming agent such as citric acid is formed, for example, and these compounds are allowed to react in the solution, there is obtained a composite complex compound as the precursor compound of (M1 M2)$O_3$.A$O_x$. When this complex compound is heated and polymerized by using a polymerization agent such as ethylene glycol, a polymerization product of the composite complex compound can be obtained. When this compound is heat treated, an intended thermistor composition can be obtained. The oxygen occlusion-release composition is added to this thermistor composition to give a composite raw material, that is then mixed, pulverized, granulated, dried, molded and baked in the same way to give a thermistor element having a uniform composition and small variance of the resistance value.

In the same way as the production method (3), the production method (4) mixes the precursor compound of (M1 M2)$O_3$.A$O_x$ in the liquid phase to prepare the first precursor solution, and then mixes the precursor compound of the oxygen occlusion-release composition in the liquid phase to prepare the second precursor solution. The first and second solutions of the precursor compounds are mixed to prepare a mixed precursor solution and the resulting solution is heat treated to give a composite raw material containing the oxygen absorption-emission composition dispersed in the thermistor composition containing (M1 M2)$O_3$.A$O_x$. Thereafter, mixing, pulverization, granulation, drying, molding and baking are carried out in the same way, giving a thermistor element having a uniform composition in which the oxygen occlusion-release composition is uniformly dispersed, and having small variance of the resistance value.

According to the production method (5), a powder of the oxygen occlusion-release composition is added to, and mixed with, the precursor solution described above before the (M1 M2)$O_3$.A$O_x$ precursor solution is heat-treated. In this way, too, the mixed precursor solution, in which the oxygen occlusion-release composition is dispersed, can be prepared. When this mixed precursor solution is heat treated, a composite raw material containing the thermistor composition in which the oxygen occlusion-release composition is dispersed can be obtained. Thereafter, mixing, pulverization, granulation, drying, molding and baking are carried out in the same way to give a thermistor element having a uniform composition in which the oxygen occlusion-release composition is uniformly dispersed, and having small variance of the resistance value.

The production method (6) prepares and mixes powder of the (M1 M2)$O_3$.A$O_x$ starting material in the same way as the basic production method (1), and prepares a precursor solution by mixing the precursor compound of the oxygen occlusion-release composition in the liquid phase in the same way as the production method (4), and allows the mixed powder of the (M1 M2)$O_3$.A$O_x$ starting material to be mixed and impregnated with the precursor solution of the oxygen occlusion-release composition to obtain a composite raw material in which the oxygen occlusion-release composition is dispersed in the thermistor composition containing (M1 M2)$O_3$.A$O_x$. Thereafter, mixing, pulverization, granulation, drying, molding and baking are carried out in the same way to give a thermistor element having a uniform composition in which the oxygen occlusion-release composition is uniformly dispersed, and having small variance of the resistance value.

The thermistor element of the present invention obtained in this way is a mixed sintered body in which the composite oxide (M1 M2)$O_3$ and the metal oxide A$O_x$ are uniformly mixed with each other through the grain boundary. Therefore, the thermistor element exhibits a low resistance value of 100 to 100 kΩ, necessary for the sensor, from room temperature (27° C., for example) to a high temperature zone of about 1,000° C., and its resistance temperature coefficient β can be adjusted in the range of 2,000 to 4,000 (K). Further, since the thermistor element has a structure in which an oxide such as $CeO_2$ as the oxygen occlusion-release composition is uniformly dispersed, it can absorb or emit oxygen in accordance with the environment. In consequence, it is possible to prevent the atmosphere inside the metal case from changing to a reducing atmosphere and the resistance value from greatly shifting.

The temperature sensor having this reduction-resistant thermistor element assembled therein was subjected to a high temperature continuous durability test (1,100° C. in air), and the resistance change was measured. Here, since the reducing-atmosphere-resistant thermistor is affected by the reducing atmosphere inside the metal case owing to the high temperature continuous durability test, the resistance change ratio ΔR becomes an index representing resistance stability of the reducing-atmosphere-resistant thermistor element. In consequence, it has been confirmed that the maximum resistance change ratio ΔR that the reducing-atmosphere-atmosphere-resistant thermistor element, according to the present invention, can stably achieve is a level of from about 1 to about 10% even when it is exposed to the reducing atmosphere inside the metal case.

The temperature accuracy of 100 temperature sensors each using the reducing-atmosphere-resistant thermistor element of the present invention is evaluated. As a result, temperature accuracy after the high temperature continuous durability test is at a ±3° C. to ±5° C. level with respect to an initial temperature accuracy of ±3° C. to ±5° C. level before the durability test. In other words, temperature accuracy remains at a substantially the same level before and after the durability test. Therefore, the reduction-resistant thermistor element of the present invention can provide a high-precision temperature sensor having a small resistance change ratio ΔR and stable characteristics, can eliminate the necessity for using a metal case made of a precious and specific material, and can reduce the cost of production.

EXAMPLE 1

Figure 3:
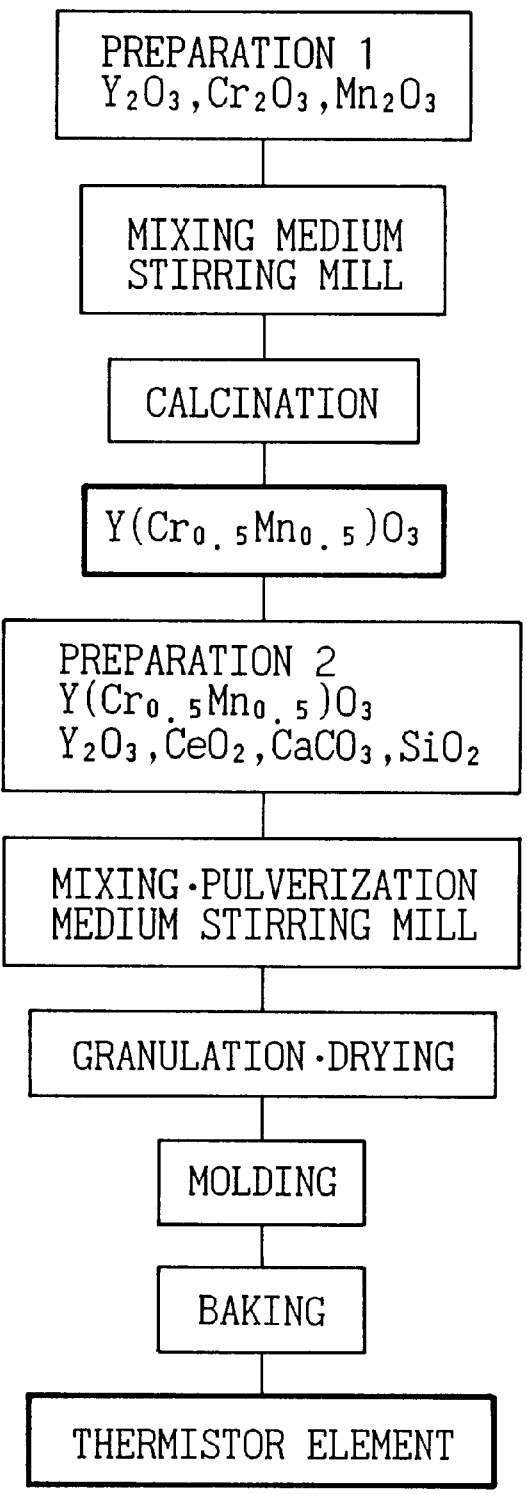
FIG. 3 is a production flowchart of a thermistor element according to Embodiment 1.

A thermistor element was produced by adding $CeO_2$ as the oxygen occlusion-release composition to a mixed sintered body $aY(Cr_{0.5}Mn_{0.5})O_3 \cdot bY_2O_3$ using $Y(Cr_{0.5}Mn_{0.5})O_3$ for the composite oxide $(M1M2)O_3$ and $Y_2O_3$ for the metal oxide $AO_x$. Here, a and b were the molar fractions of $Y(Cr_{0.5}Mn_{0.5})O_3$ and $Y_2O_3$, respectively, and were selected so as to obtain a desired resistance value and a desired resistance temperature coefficient. They were a=0.40 and b=0.60 in this case. The production process of the thermistor of Example 1 will be explained with reference to FIG. 3.

In the preparation 1 step, $Y_2O_3$, $Cr_2O_3$ and $Mn_2O_3$ each having purity of at least 99.9% as an oxide of each metal element were prepared as the starting powder of the composite oxide $Y(Cr_{0.5}Mn_{0.5})O_3$, and were weighed so that the composition after heat treatment (calcination) was $Y(Cr_{0.5}Mn_{0.5})O_3$. In the next mixing step, the raw material powder was mixed by use of a medium stirring mill to uniformly mix the starting materials. A pearl mill device RV1V, a product of Ashizawa Co., Ltd., having an effective capacity of 1.0 liter and a real capacity of 0.5 liter was used as the medium stirring mill. Balls (diameter: 0.5 mm) of zirconia ($ZrO_2$) as the pulverization medium were charged to 80% of the volume of a stirring tank, and a dispersant and a binder were added to the mixed raw materials. Mixing and pulverization were carried out for 10 hours at a peripheral speed of 12 m/sec and at 3,110 rpm.

The mixed raw material slurry of $T_2O_3$, $Cr_2O_3$ and $Mn_2O_3$ thus obtained was dried by using a spray drier at 200° C. at the inlet of a drying chamber and 120° C. at its outlet. Next, in the calcination step, the dried mixed raw material was charged into a crucible made of 99.7% alumina ($Al_2O_3$) and was calcined in open air at 1,100 to 1,300° C. for 1 to 2 hours, giving $Y(Cr_{0.5}Mn_{0.5})O_3$ in lump form. The calcined product was coarsely pulverized by using a chaser mill, and was passed through a 500 μm sieve.

Next, in the preparation 2 step, the resulting raw material composition $Y(Cr_{0.5}Mn_{0.5})O_3$ and the metal oxide $Y_2O_3$ forming the mixed sintered body with the former were mixed in such a manner as to attain the object composition $aY(Cr_{0.5}Mn_{0.5})O_3 \cdot bY_2O_3$ (a=0.40, b=0.60), giving a thermistor composition. Further, $CeO_2$ as the oxygen occlusion release composition and sintering assistants $CaCO_3$ and $SiO_2$ were mixed. Fine powder having purity of at least 99.9% (a product of Kojundo Kagaku K. K.) was used for $CeO_2$, and 5 mol % was added to the total molar number of $Y(Cr_{0.5}Mn_{0.5})O_3$, $Y_2O_3$ and $CeO_2$. $CaCO_3$ was added in an amount of 4.5 wt % and $SiO_2$, in an amount of 3 wt %. In the subsequent mixing and pulverization step, the same medium stirring mill (pearl mill device) as the one used in the mixing step was used to achieve uniform mixing, and the resulting mixture was mixed and pulverized under the same pulverization condition. In the mixing and pulverization step, a dispersant, a binder and a mold release agent were added and were simultaneously pulverized.

The composite raw material slurry containing the oxygen occlusion-release composition $CeO_2$ and obtained in this way was granulated and dried in the granulation and drying step by use of a spray drier to give mixed powder of the composite raw material containing $Y(Cr_{0.5}Mn_{0.5})O_3$, $Y_2O_3$ and $CeO_2$. A thermistor element having a similar shape to the shape shown in FIG. 1 was produced from this mixed powder as the thermistor composite raw material. The molding step was carried out by use of a mold. Lead wires were made of pure platinum (Pt100) having an outer diameter of 0.3 mm and a length of 10.5 mm. After the lead wires were inserted to a mold having an outer diameter of 1.89 mm, molding was carried out at a pressure of about 1,000 $kgf/cm^2$ to give a molded article which had an outer diameter of 1.9 mm and into which the lead wires were buried.

In the sintering step, the resulting molded articles of the thermistor elements 1 were aligned in a corrugation mold made of $Al_2O_3$, and were baked in open air at 1,400 to 1,700° C. for 1 to 2 hours to give sintered bodies having a sintered particle diameter of 8 μm. There were thus obtained thermistor elements 1 each consisting of the mixed sintered body $Y(Cr_{0.5}Mn_{0.5})O_3 \cdot Y_2O_3 + CeO_2$ and having an outer diameter of 1.6 mm. Each thermistor element 1 was assembled in the ordinary temperature sensor assembly shown in FIG. 2 to produce a temperature sensor S.

Next, the temperature sensor S having assembled therein the thermistor element 1 of Example 1 was charged into a high temperature furnace and was subjected to a high temperature continuous durability test in air at 1,100° C. for 1,000 hours to measure the resistance change of the temperature sensor. The result was shown in Table 1. Here, the resistance change ratio ΔR in Table 1 represents the resistance change of the temperature sensor during the high temperature continuous durability test in air at 1,100° C., and is expressed by the following equation (1):

$$\Delta R(\%) = (RMAX_t / Rinitial_t) \times 100 - 100 \quad (1)$$

Here, $Rinitial_t$ is an initial resistance value at a predetermined temperature t (such as 600° C.), and $RMAX_t$ is the maximum resistance value of the temperature sensor S, that is left standing at 1,100° C., at the predetermined temperature t.

The reducing atmosphere inside the metal case 2 affected the thermistor element 1 during this high temperature durability test. Therefore, the resistance change ratio ΔR became an index representing resistance stability of the thermistor element 1 in this example. It could be confirmed from the result tabulated in Table 1 that the thermistor element 1 of Example 1 could stably accomplish the level of the maximum resistance change ratio ΔR of about 3% to about 5% even under the condition where the thermistor element 1 was exposed to the reducing atmosphere such as inside the metal case 2.

Table 1 also tabulates the evaluation results of temperature accuracy of 100 temperature sensors after the high temperature continuous durability test. The evaluation method of temperature accuracy of 100 temperature sensors comprised the steps of calculating a standard deviation σ(sigma) at 600° C. from the resistance value-temperature data of 100 temperature sensors, setting six times of the standard deviation σ as the variance width (on both sides), converting the resistance value variance width to a temperature, halving this value to obtain a value A, and using this value A for temperature accuracy ±A° C.

As a result, the thermistor element of Example 1 exhibited temperature accuracy of ±5° C. after the high temperature durability test at 1,100° C. for 1,000 hours as tabulated in Table 1. Incidentally, initial temperature accuracy of 100 temperature sensors before the durability test was ±5° C., and no change was observed before and after the durability test. In this way, the thermistor element according to the present invention was excellent in reducing-atmosphere resistance and the characteristics remained stable for a long time. Therefore, the present invention can provide an economical and high accuracy temperature sensor that eliminates the necessity for a precious and specific metal case.

TABLE 1

| thermistor composition at pulverization | oxygen absorption-emission composition | maximum resistance change ratio (%) | temperature accuracy after durability test at 1100° C. for 1000 hrs. (N = 100, ±6σ) |
|---|---|---|---|
| Example 1 Y(CrMn)$O_3$ · $Y_2O_3$ | $CeO_2$ | 3–5 | ±5° C. |
| Example 2 Y(CrMn)$O_3$ · $Y_2O_3$ | $CeO_2$ | 3–5 | ±5° C. |
| Example 3 Y(CrMn)$O_3$ · $Y_2O_3$ | $Pr_6O_{11}$ | 5–8 | ±5° C. |
| Example 4 Y(CrMn)$O_3$ · $Y_2O_3$ | $Tb_4O_7$ | 5–10 | ±5° C. |
| Example 5 Y(CrMn)$O_3$ · $Y_2O_3$ | $2CeO_2$ · $Y_2O_3$ | 2–4 | ±5° C. |
| Example 6 Y(CrMn)$O_3$ · $Y_2O_3$ | $CeO_2$ · $2ZrO_2$ | 2–4 | ±5° C. |
| Example 7 Y(CrMn)$O_3$ · $Y_2O_3$ | $CeO_2$ | 1–3 | ±5° C. |
| Example 8 Y(CrMn)$O_3$ · $Y_2O_3$ | $2CeO_2$ · $Y_2O_3$ | 1–3 | ±5° C. |

EXAMPLE 2

Figure 4:
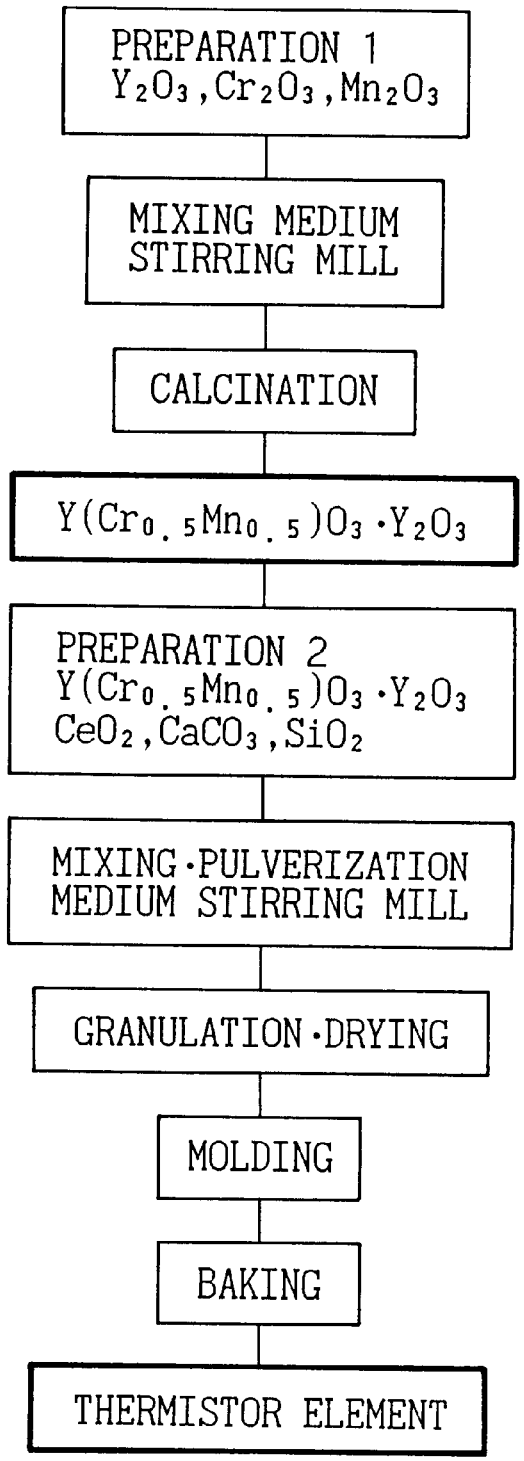
FIG. 4 is a production flowchart of a thermistor element according to Embodiment 2.

In Example 2, a thermistor element was produced by adding $CeO_2$ as the oxygen occlusion-release composition to the mixed sintered body $aY(Cr_{0.5}Mn_{0.5})O_3 \cdot bY_2O_3$ (a=0.40, b+0.60) by use of the same starting materials as those of Example 1. A production process of the thermistor element of Example 2 will be explained with reference to FIG. 4.

In the preparation 1 step, $Y_2O_3$, $Cr_2O_3$ and $Mn_2O_3$ powder each having purity of at least 99.9% as an oxide of each metal element were prepared as the starting powder of the composite oxide $Y(Cr_{0.5}Mn_{0.5})O_3 \cdot Y_2O_3$, and were weighed so that the composition after heat treatment (calcination) attained the object composition after calcination. Thereafter, a calcined product of $Y(Cr_{0.5}Mn_{0.5})O_3 \cdot Y_2O_3$, in lump form, was obtained through a similar mixing step and calcination step as in Example 1. The calcined product was further pulverized roughly by use of a chaser mill and was passed through a 200 μm sieve to give a thermistor composition.

In the preparation 2 step, 5 mol %, on the basis of the total molar number of $Y(Cr_{0.5}Mn_{0.5})O_3$, $Y_2O_3$ and $CeO_2$, of $CeO_2$ as the oxygen absorption-emission composition, 4.5 wt % of $CaCO_3$ and 3 wt % of $SiO_2$ as sintering assistants, were mixed with the resulting thermistor composition $Y(Cr_{0.5}Mn_{0.5})O_3 \cdot Y_2O_3$ in the same way as in Example 1 to obtain a composite raw material. Thereafter, the composite raw material was mixed, pulverized, granulated, dried, molded and baked in the same way to give a thermistor element consisting of $Y(Cr_{0.5}Mn_{0.5})O_3 \cdot Y_2O_3 + CeO_2$.

This thermistor element was assembled to produce a temperature sensor and was evaluated in the same way as in Example 1. Table 1 tabulates the maximum resistance change ratio ΔR and temperature accuracy after the high temperature continuous durability test and initial temperature accuracy. As tabulated in Table 1, it could be confirmed that the thermistor element according to Example 2, too, could provide the maximum resistance change ratio ΔR of the level of about 3% to 5%. Temperature accuracy after the high temperature continuous durability test was ±5° C. and initial temperature accuracy before the durability test was ±5° C., and a thermistor element excellent in reducing-atmosphere-resistance and having high accuracy could be accomplished.

EXAMPLE 3

Figure 5:
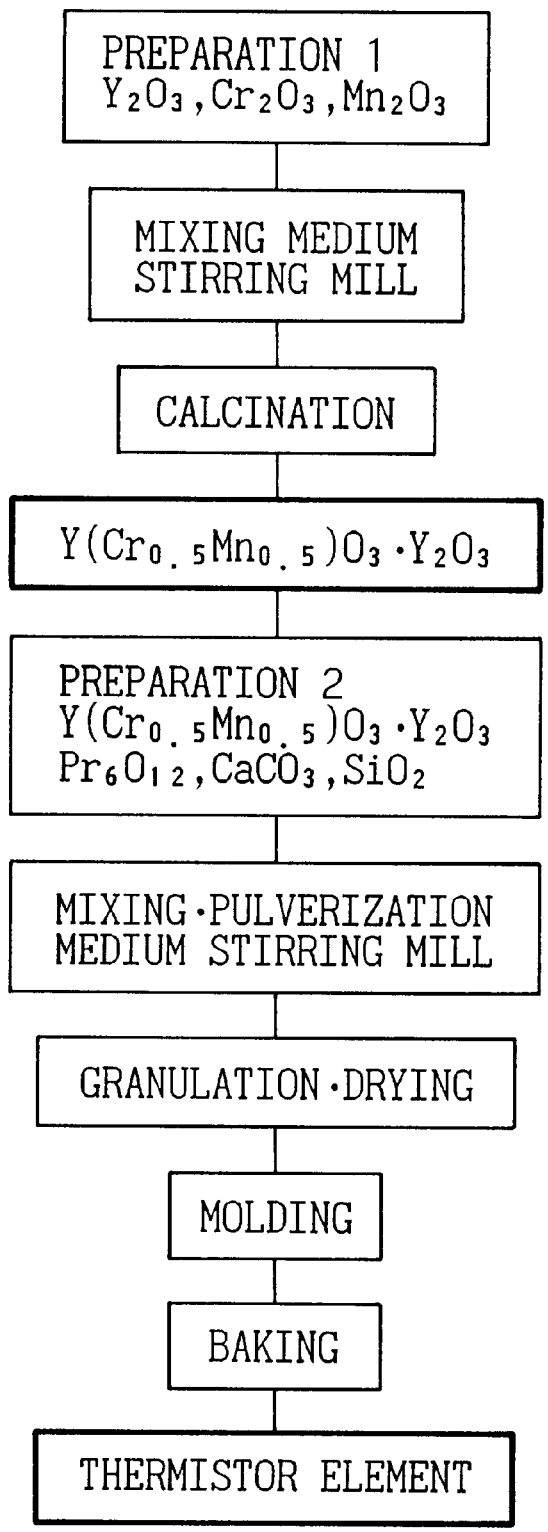
FIG. 5 is a production flowchart of a thermistor element according to Embodiment 3.

In this Example 3, a thermistor element was produced by adding $Pr_6O_{11}$ as the oxygen occlusion-release composition to the mixed sintered body $aY(Cr_{0.5}Mn_{0.5})O_3 \cdot bY_2O$ (a=0.38, b=0.62) in the same way as in Example 2. FIG. 5 shows a production process of the thermistor element in this Example 3. In the production process shown in FIG. 5, the process steps up to the calcining step were carried out in the same way as in Example 2 (see FIG. 4) to obtain a thermistor composition $Y(Cr_{0.5}Mn_{0.5})O_3 \cdot Y_2O_3$. In the preparation 2 step, $Pr_6O_{11}$ as the oxygen occlusion-release composition and 4.5 wt % of $CaCO_3$ and 3 wt % of $SiO_2$ as sintering assistants were mixed with the thermistor composition $Y(Cr_{0.5}Mn_{0.5})O_3 \cdot Y_2O_3$ to attain a composite raw material. $Pr_6O_{11}$, as the oxygen occlusion-release composition, was a fine powder having purity of at least 99.9% (a product of Kojundo Kagaku K.K.), and 5 mol %, on the basis of the total molar number of $Y(Cr_{0.5}Mn_{0.5})O_3$, $Y_2O_3$ and $Pr_6O_{11}$ was added. Thereafter, a thermistor element consisting of $Y(Cr_{0.5}Mn_{0.5})O_3 \cdot Y_2O_3 + Pr_6O_{11}$ was obtained in the same way as in Example 1.

This thermistor element was assembled to produce a temperature sensor and was evaluated in the same way as in Example 1. Table 1 tabulates the maximum resistance change ratio ΔR, temperature accuracy after the high temperature continuous durability test and initial temperature accuracy. As tabulated in Table 1, it could be confirmed that the thermistor element according to Example 2, too, could stably accomplish the maximum resistance change ratio ΔR of the level of about 5 to 8%. Temperature accuracy after the high temperature continuous durability test was ±5° C. and initial temperature accuracy before the durability test was ±5° C., and a thermistor element excellent in reducing-atmosphere-resistance and having high accuracy could be accomplished.

EXAMPLE 4

Figure 6:
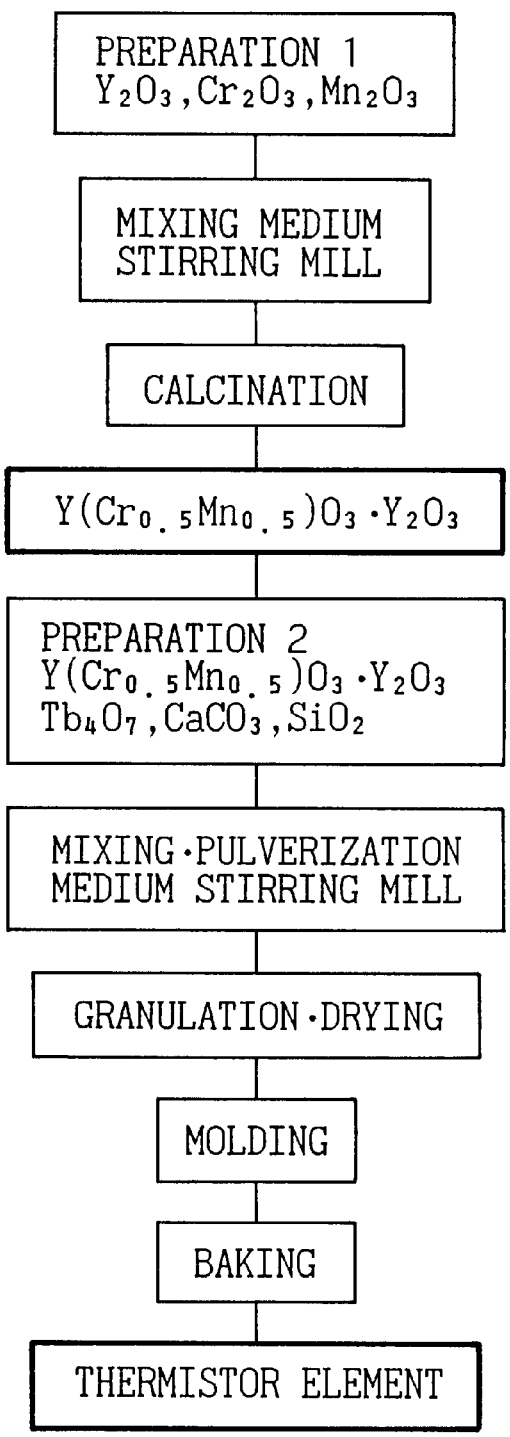
FIG. 6 is a production flowchart of a thermistor element according to Embodiment 4.

In this Example 4, a thermistor element was produced by adding $Tb_4O_7$ as the oxygen occlusion-release composition to the mixed sintered body $aY(Cr_{0.5}Mn_{0.5})O_3 \cdot bY_2O$ (a=0.42, b=0.58) in the same way as in Example 2. FIG. 6 shows a production process of the thermistor element in this Example 4. In the production process shown in FIG. 6, the process steps up to the calcining step were carried out in the same way as in Example 2 (see FIG. 4) to obtain a thermistor composition $Y(Cr_{0.5}Mn_{0.5})O_3 \cdot Y_2O_3$. In the preparation 2 step, $Tb_4O_7$ as the oxygen occlusion-release composition and 4.5 wt % of $CaCO_3$ and 3 wt % of $SiO_2$ as the sintering assistants were mixed with the thermistor composition $Y(Cr_{0.5}Mn_{0.5})O_3 \cdot Y_2O_3$ to obtain a composite raw material. $Tb_4O_7$, as the oxygen occlusion-release composition, was a fine powder having purity of at least 99.9% (a product of Kojundo Kagaku K. K.), and 5 mol % on the basis of the total molar number of $Y(Cr_{0.5}Mn_{0.5})O_3$, $Y_2O_3$ and $Tb_4O_7$ was added. Thereafter, a thermistor element consisting of $Y(Cr_{0.5}Mn_{0.5})O_3 \cdot Y_2O_3 + Tb_4O_7$ was obtained in the same way as in Example 1.

This thermistor element was assembled to produce a temperature sensor and was evaluated in the same way as in Example 1. Table 1 tabulates the maximum resistance change ratio $\Delta R$, the temperature accuracy after the high temperature continuous durability test and the initial temperature accuracy. As tabulated in Table 1, it could be confirmed that the thermistor element according to Example 4, too, could stably accomplish the maximum resistance change ratio $\Delta R$ of the level of about 5 to 10%. Temperature accuracy after the high temperature continuous durability test was ±5° C. and initial temperature accuracy before the durability test was ±5° C., and a thermistor element excellent in reducing-atmosphere-resistance and having high accuracy could be provided.

EXAMPLE 5

Figure 7:
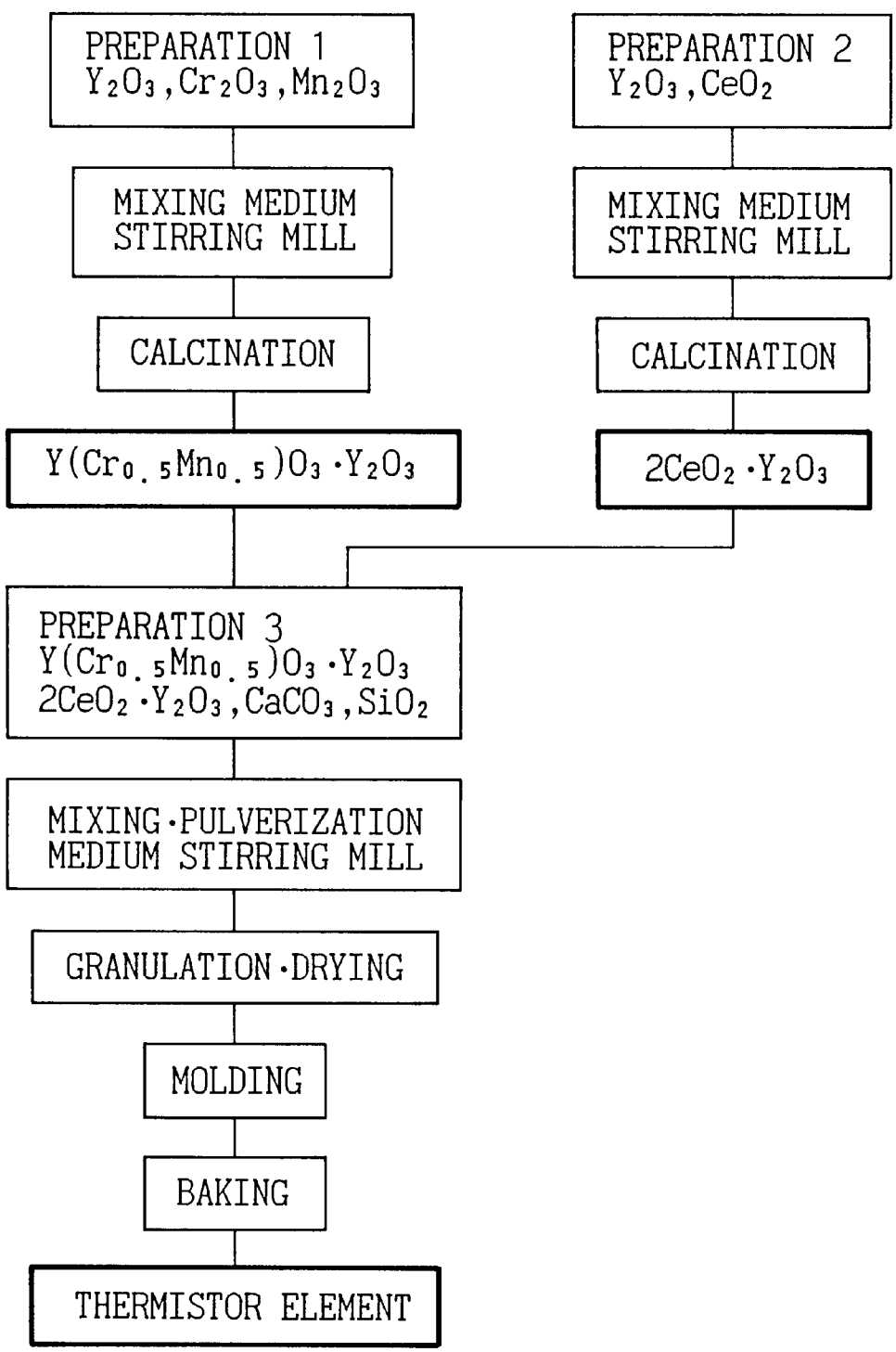
FIG. 7 is a production flowchart of a thermistor element according to Embodiment 5.

On the basis of the production process shown in FIG. 7, a thermistor element was produced by adding $2CeO_2 \cdot Y_2O_3$ as the oxygen occlusion-release composition to the mixed sintered body $aY(Cr_{0.5}Mn_{0.5})O_3 \cdot bY_2O$ (a=0.40, b=0.60). In this Example 5, the mixed sintered body $Y(Cr_{0.5}Mn_{0.5})O_3 \cdot Y_2O$ and the $2CeO_2 \cdot Y_2O_3$ as the oxygen occlusion-release composition were added separately and were mixed to obtain the thermistor composite raw material.

The process steps from the preparation 1 step to the calcining step were carried out in the same way as in Example 2 (see FIG. 4) to obtain a thermistor composition $Y(Cr_{0.5}Mn_{0.5})O_3 \cdot Y_2O_3$. In the preparation 2 step, $CeO_2$ and $Y_2O_3$ having purity of at least 99.9% were prepared as the starting powder of $2CeO_2 \cdot Y_2O_3$ as the oxygen occlusion-release composition and were mixed to give the $2CeO_2 \cdot Y_2O_3$ composition. Thereafter, the mixing step and the calcining step were carried out in the same way as the preparation of the raw material composition of the mixed sintered body, and $2CeO_2 \cdot Y_2O_3$ was obtained.

In the subsequent preparation 3 step, the thermistor composition $Y(Cr_{0.5}Mn_{0.5})O_3 \cdot Y_2O_3$ and the oxygen occlusion-release composition $2CeO_2 \cdot Y_2O_3$ obtained in the manner described above were mixed to give the composite raw material.

In the subsequent preparation 3 step, the $Y(Cr_{0.5}Mn_{0.5})O_3 \cdot Y_2O_3$ composition and the oxygen occlusion-release composition $2CeO_2 \cdot Y_2O_3$ were mixed to obtain the composite raw material. The oxygen occlusion-release composition $2CeO_2 \cdot Y_2O_3$ was added in the amount of 5 mol % on the basis of the total molar number of $Y(Cr_{0.5}Mn_{0.5})O_3$, $Y_2O_3$ and $2CeO_2 \cdot Y_2O_3$. Furthermore, 4.5 wt % of $CaCO_3$ and 3 wt % of $SiO_2$ as sintering assistants were added. Thereafter, a thermistor element consisting of $Y(Cr_{0.5}Mn_{0.5})O_3 \cdot Y_2O_3 + 2CeO_2 \cdot Y_2O_3$ was obtained in the same way as in Example 1.

This thermistor element was assembled to produce a temperature sensor and was evaluated in the same way as in Example 1. Table 1 tabulates the maximum resistance change ratio $\Delta R$, the temperature accuracy after the high temperature continuous durability test and the initial temperature accuracy. As tabulated in Table 1, it could be confirmed that the thermistor element according to Example 5, too, could stably accomplish the maximum resistance change ratio $\Delta R$ of the level of about 2 to 4%. Temperature accuracy after the high temperature continuous durability test was ±5° C. and initial temperature accuracy before the durability test was ±5° C., and a thermistor element excellent in reducing-atmosphere-resistance and having high accuracy could be provided.

EXAMPLE 6

Figure 8:
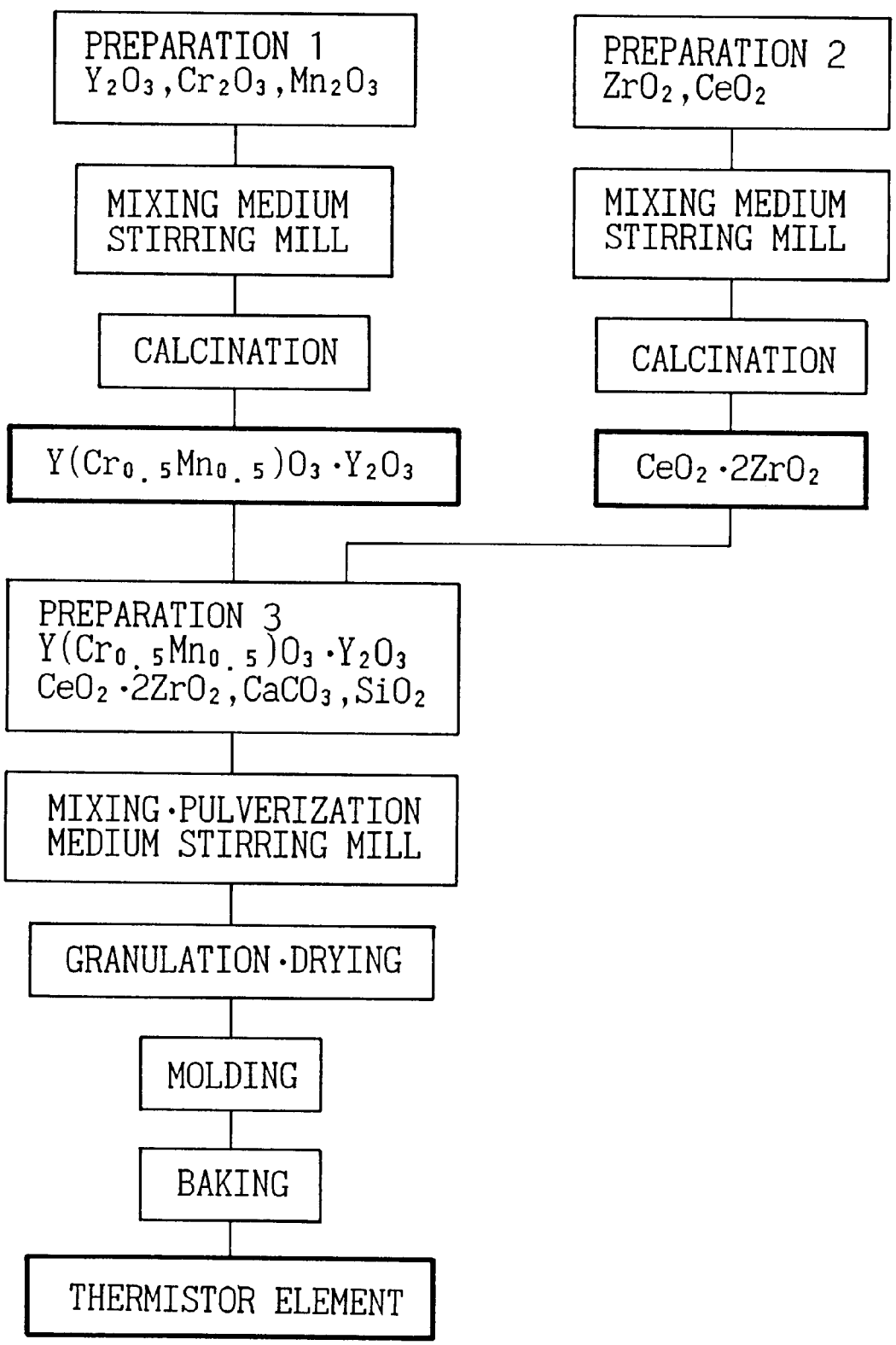
FIG. 8 is a production flowchart of a thermistor element according to Embodiment 6.

On the basis of the production process shown in FIG. 8, a thermistor element was produced by adding $CeO_2 \cdot 2ZrO_2$ as the oxygen occlusion-release composition to the mixed sintered body $aY(Cr_{0.5}Mn_{0.5})O_3 \cdot bY_2O$ (a=0.38, b=0.62). In this Example 6, the mixed sintered body $Y(Cr_{0.5}Mn_{0.5})O_3 \cdot Y_2O$ and the $2CeO_2 \cdot Y_2O_3$ as the oxygen occlusion-release composition were added separately and were mixed to obtain the thermistor composite raw material.

The process steps from the preparation 1 step to the calcining step were carried out in the same way as in Example 2 (see FIG. 4) to obtain a thermistor composition $Y(Cr_{0.5}Mn_{0.5})O_3 \cdot Y_2O_3$. In the preparation 2 step, $CeO_2$ and $ZrO_2$ having purity of at least 99.9% were prepared as the starting powder of $CeO_2$ and $2ZrO_2$ as the oxygen occlusion-release composition and were mixed to give the $CeO_2 \cdot 2ZrO_2$ composition. Thereafter, the mixing step and the calcining step were carried out in the same way as the preparation of the thermistor composition, and the oxygen occlusion-release composition $CeO_2 \cdot 2ZrO_2$ was obtained.

In the subsequent preparation 3 step, the thermistor composition $Y(Cr_{0.5}Mn_{0.5})O_3 \cdot Y_2O_3$ and the oxygen occlusion-release composition $CeO_2 \cdot 2ZrO_2$ obtained in the manner described above were mixed to give the composite raw material. The oxygen absorption-emission composition $CeO_2 \cdot 2ZrO_2$ was added in the amount of 5 mol % on the basis of the total molar number of $Y(Cr_{0.5}Mn_{0.5})O_3$, $Y_2O_3$ and $CeO_2 \cdot 2ZrO_2$. Furthermore, 4.5 wt % of $CaCO_3$ and 3 wt % of $SiO_2$ as sintering assistants were added. Thereafter, a thermistor element consisting of $Y(Cr_{0.5}Mn_{0.5})O_3 \cdot Y_2O_3 + CeO_2 \cdot 2ZrO_2$ was obtained in the same way as in Example 1.

This thermistor element was assembled to produce a temperature sensor and was evaluated in the same way as in Example 1. Table 1 tabulates the maximum resistance change ratio $\Delta R$, temperature accuracy after the high temperature continuous durability test and initial temperature accuracy. As tabulated in Table 1, it could be confirmed that the thermistor element according to Example 6, too, could stably accomplish the maximum resistance change ratio $\Delta R$ of the level of about 2 to 4%. Temperature accuracy after the high temperature continuous durability test was ±4° C. and initial temperature accuracy before the durability test was ±4° C., and a thermistor element excellent in reducing-atmosphere-resistance and having high accuracy could be provided

EXAMPLE 7

In this Example 7, a thermistor element was produced by adding $CeO_2$ as the oxygen occlusion-release composition to the mixed sintered body $aY(Cr_{0.5}Mn_{0.5})O_3 \cdot by_2O_3$ (a=0.38, b=0.62) in the same way as in Example 2. As can be seen from FIG. 9 showing the production process, however, the method of this example was different from that of Example 2 (see FIG. 4) in that $CeO_2$ ultra-fine particles having a particle diameter in the level of a nanometer (hereinafter called "nano-$CeO_2$") were used.

Figure 9:
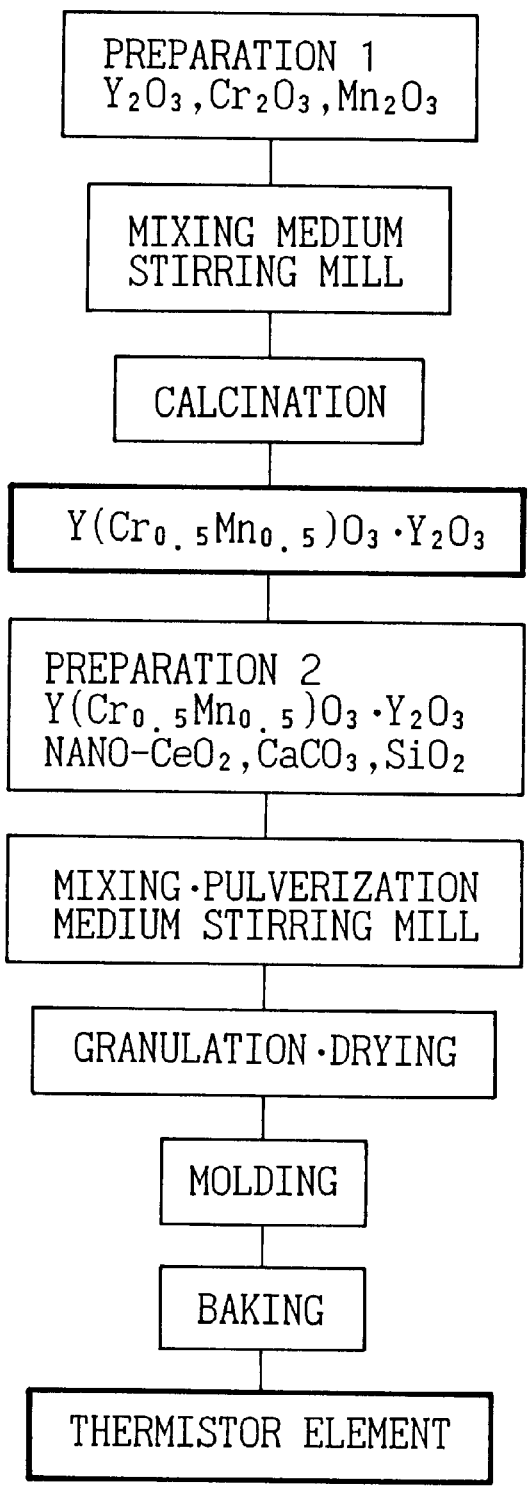
FIG. 9 is a production flowchart of a thermistor element according to Embodiment 7.

In the production process shown in FIG. 9, the steps up to the calcining step were carried out in the same way as in Example 2 (see FIG. 4) to obtain the thermistor composition $Y(Cr_{0.5}Mn_{0.5})O_3 \cdot Y_2O_3$. In the preparation 2 step, nano-$CeO_2$ as the oxygen occlusion-release composition was mixed with this raw material composition to obtain a composite raw material. A ultra-fine particle raw material (a product of CI Kasei K. K.) having purity of 99.95% and a mean particle diameter of 10 nm was used for the nano-$CeO_2$, and 5 mol % was added on the basis of the total molar number of $Y(Cr_{0.5}Mn_{0.5})O_3$ and $Y_2O_3$. Furthermore, 4.5 wt % of $CaCO_3$ and 3 wt % of $SiO_2$ as sintering assistants were added. Thereafter, a thermistor element consisting of $Y(Cr_{0.5}Mn_{0.5})O_3.Y_2O_3+CeO_2$ was obtained in the same way as in Example 1.

This thermistor element was assembled to produce a temperature sensor and was evaluated in the same way as in Example 1. Table 1 tabulates the maximum resistance change ratio $\Delta R$, temperature accuracy after the high temperature continuous durability test and initial temperature accuracy. As tabulated in Table 1, it could be confirmed that the thermistor element according to Example 7, too, could stably provide a maximum resistance change ratio $\Delta R$ at a level of about 1% to 3%. The temperature accuracy after the high temperature continuous durability test was ±5° C. and the initial temperature accuracy before the durability test was ±5° C., and a thermistor element excellent in reducing-atmosphere-resistance and having high accuracy could be provided.

EXAMPLE 8

Figure 10:
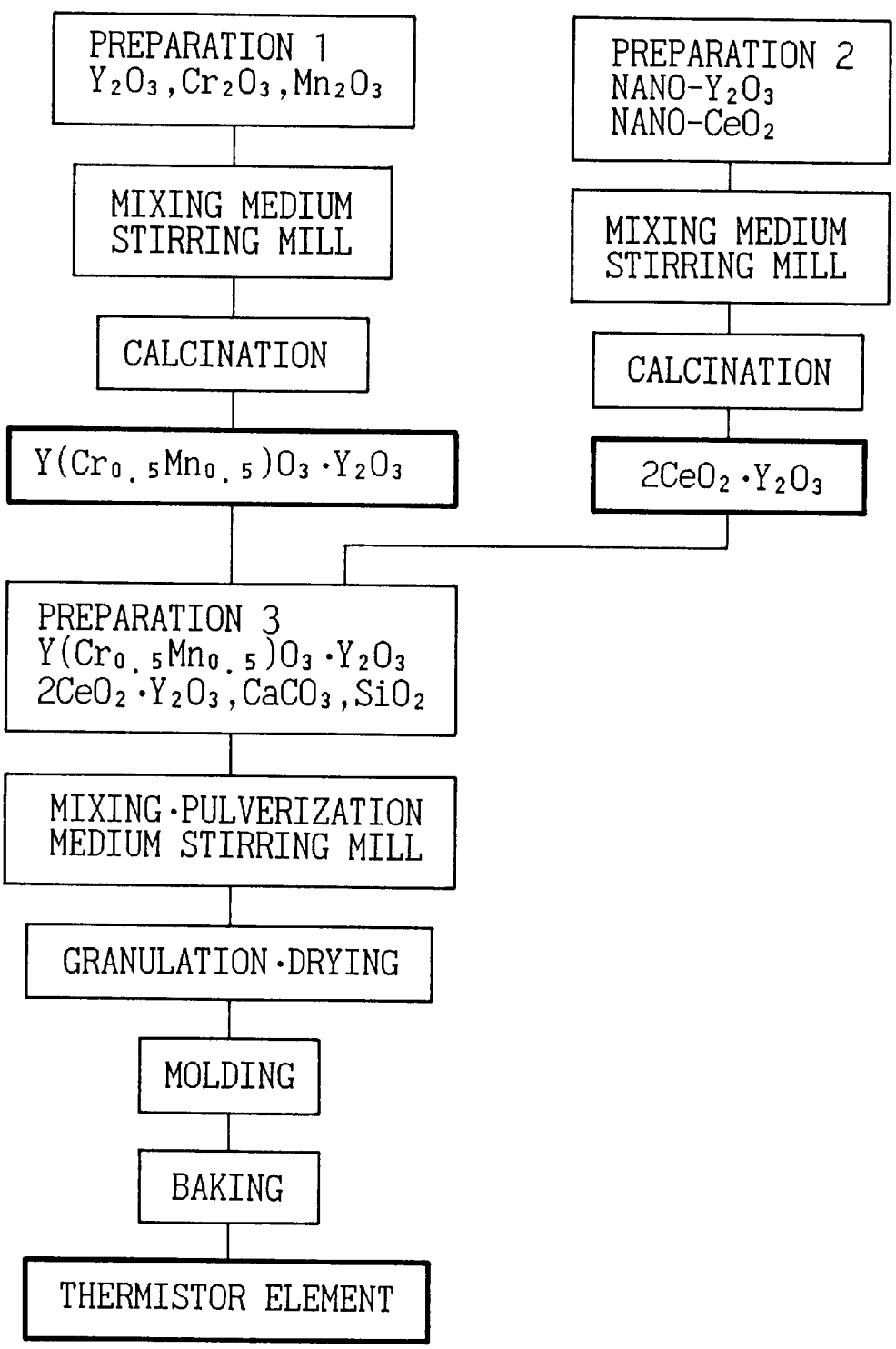
FIG. 10 is a production flowchart of a thermistor element according to Embodiment 8.

In this Example 8, a thermistor element was produced by adding $2CeO_2.Y_2O_3$ as the oxygen occlusion-release composition to the mixed sintered body $aY(Cr_{0.5}Mn_{0.5})O_3.bY_2O_3$ (a=0.38, b=0.62) in the same way as in Example 5. As can be seen from FIG. 10 showing the production process, however, the method of this example was different from that of Example 5 (see FIG. 7) in that $CeO_2$ and $Y_2O_3$ of ultra-fine particles having a particle diameter in the level of a nanometer (hereinafter called "nano-$CeO_2$" and "nano-$Y_2O_3$") were used as the starting materials of $2CeO_2.Y_2O_3$.

First, the steps from the preparation 1 step to the calcining step were carried out in the same way as in Example 5 to obtain the thermistor composition $Y(Cr_{0.5}Mn_{0.5})O_3.Y_2O_3$ of the mixed sintered body. In the preparation 2 step, nano-$CeO_2$ (mean particle diameter: 10 nm, a product of CI Kasei K. K.) and nano-$Y_2O_3$ (mean particle diameter: 20 nm, a product of CI Kasei K. K.) were prepared as the starting powder of the oxygen occlusion-release composition $2CeO_2.Y_2O_3$ These nano-CeO2 and nano-$Y_2O_3$ were mixed so as to achieve the $2CeO_2.Y_2O_3$ composition. Thereafter, the mixing step and the calcining step were carried out in the same way to obtain the oxygen occlusion-release composition $2CeO_2.Y_2O_3$ that was a solid solution at a nano-level of the mean particle diameter of 50 to 100 nm.

In the preparation step 3, the thermistor composition $Y(Cr_{0.5}Mn_{0.5})O_3.Y_2O_3$ and the oxygen occlusion-release composition $2CeO_2.Y_2O_3$ obtained in the manner described above were mixed to give a composite raw material. The amount of the oxygen occlusion-release composition $2CeO_2.Y_2O_3$ was 5 mol % on the basis of the total molar number of $Y(Cr_{0.5}Mn_{0.5})O_3$, $Y_2O_3$ and $2CeO_2.Y_2O_3$. Furthermore, 4.5 wt % of $CaCO_3$ and 3 wt % of $SiO_2$ as sintering assistants were added. Thereafter, a thermistor element consisting of $Y(Cr_{0.5}Mn_{0.5})O_3.Y_2O_3+2CeO_2.Y_2O_3$ was obtained in the same way as in Example 1.

This thermistor element was assembled to produce a temperature sensor and was evaluated in the same way as in Example 1. Table 1 tabulates the maximum resistance change ratio $\Delta R$, the temperature accuracy after the high temperature continuous durability test and the initial temperature accuracy. As tabulated in Table 1, it could be confirmed that the thermistor element according to Example 8, too, could stably accomplish the maximum resistance change ratio $\Delta R$ at a high level of about 1% to 3%. The temperature accuracy after the high temperature continuous durability test was ±5° C. and the initial temperature accuracy before the durability test was ±5° C., and a thermistor element excellent in reducing-atmosphere-resistance and having high accuracy could be provided.

EXAMPLE 9

Figure 11:
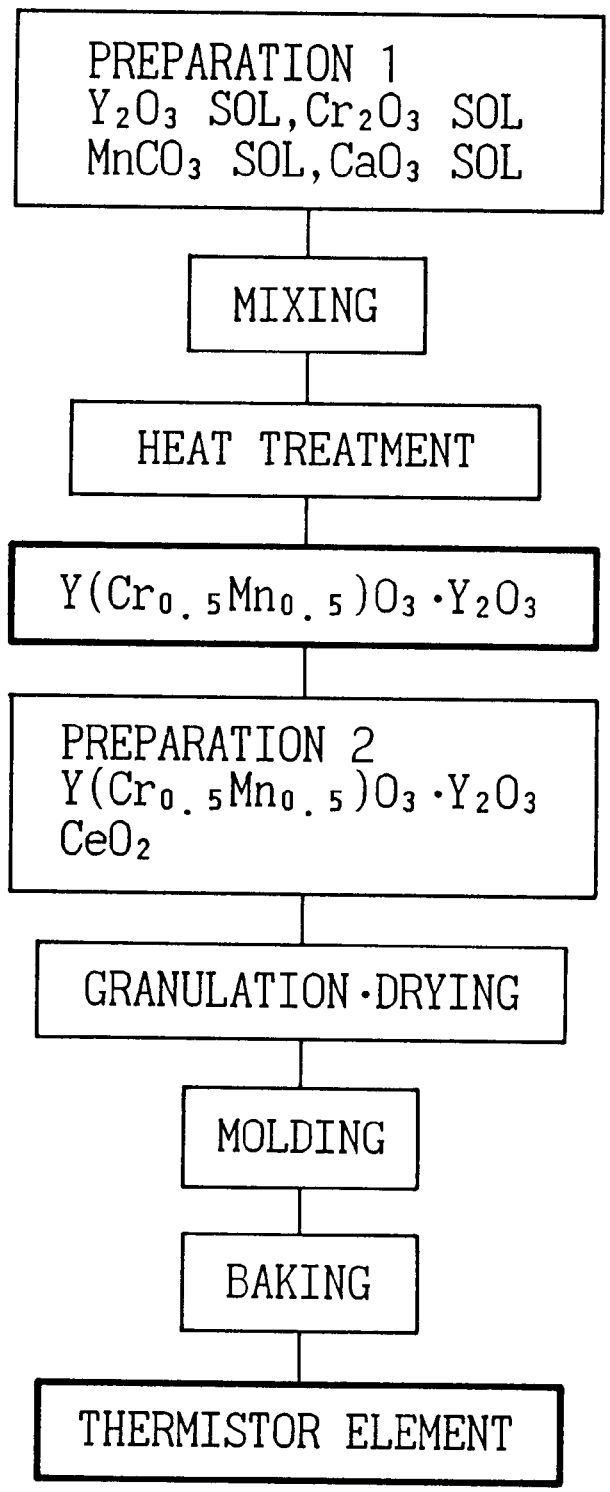
FIG. 11 is a production flowchart of a thermistor element according to Embodiment 9.

In this Example 9, a thermistor element was produced by adding $CeO_2$ as the oxygen occlusion-release composition to the mixed sintered body $aY(Cr_{0.5}Mn_{0.5})O_3.bY_2O_3$ (a=0.40, b=0.60) in the same way as in Example 2. As can be seen from FIG. 11 showing the production process, however, the method of this example was different from that of Example 2 in that sol particles having a mean particle diameter of not greater than 100 nm were used as the starting materials of the mixed sintered body.

In the preparation 1 step, the sol particles of $Y_2O_3$, $Cr_2O_3$ and $Mn_2O_3$ each having purity of at least 99.9% and a mean particle diameter of not greater than 100 nm and each being an oxide of each metal element as the starting powder of the mixed sintered body $Y(Cr_{0.5}Mn_{0.5})O_3.Y_2O_3$, were prepared and weighed so that the composition after heat treatment (calcinations) attained $aY(Cr_{0.5}Mn_{0.5})O_3.bY_2O_3$ (a=0.40, b=0.60). Thereafter, the mixing step and the calcining step were carried out in the same way as in Example 1 to obtain a calcined product of $Y(Cr_{0.5}Mn_{0.5})O_3.Y_2O_3$ in lump form. This calcined product was further roughly pulverized by use of a chaser mill and passed through a 500 $\mu$m sieve, thereby giving a thermistor composition.

In the preparation 2 step, the resulting thermistor composition $Y(Cr_{0.5}Mn_{0.5})O_3.Y_2O_3$ and $CeO_2$ as the oxygen occlusion-release composition were mixed. The same fine powder raw material having purity of at least 99.9% (a product of Kojundo Kagaku K. K.) as that of Example 1 was used for $CeO_2$. The amount of $CeO_2$ was 5 mol % on the basis of the total molar number of $Y(Cr_{0.5}Mn_{0.5})O_3$, $Y_2O_3$ and $CeO_2$. Furthermore, 4.5 wt % of $CaCO_3$ and 3 wt % of $SiO_2$ as sintering assistants were added. Thereafter, granulation, drying and molding were carried out and a thermistor element consisting of $Y(Cr_{0.5}Mn_{0.5})O_3.Y_2O_3+CeO_2$ was obtained in the same way as in Example 1.

This thermistor element was assembled to produce a temperature sensor and was evaluated in the same way as in Example 1. Table 2 tabulates the maximum resistance change ratio $\Delta R$, the temperature accuracy after the high temperature continuous durability test and the initial temperature accuracy. AS tabulated in Table 2, it could be confirmed that the thermistor element according to Example 9, too, could stably accomplish the maximum resistance change ratio $\Delta R$ at the high level of about 3% to 5%. Temperature accuracy after the high temperature continuous durability test was ±3° C. and initial temperature accuracy before the durability test was ±3° C., and a thermistor element excellent in reduction resistance and having high accuracy could be provided.

TABLE 2

| | thermistor composition at pulverization | oxygen absorption-emission composition | maximum resistance change ratio (%) | temperature accuracy after durability test at 1100° C. for 1000 hrs. (N = 100, ±6σ) |
|---|---|---|---|---|
| Example 9 | $Y(CrMn)O_3 \cdot Y_2O_3$ | $CeO_2$ | 3–5 | ±3° C. |
| Example 10 | $Y(CrMn)O_3 \cdot Y_2O_3$ | $CeO_2$ | 3–5 | ±3° C. |
| Example 11 | $Y(CrMn)O_3 \cdot Y_2O_3$ | $2CeO_2 \cdot Y_2O_3$ | 3–5 | ±3° C. |
| Example 12 | $Y(CrMn)O_3 \cdot Y_2O_3$ | $CeO_2$ | 3–5 | ±3° C. |
| Example 13 | $Y(CrMn)O_3 \cdot Y_2O_3 + CeO_2$ | $CeO_2$ | 3–5 | ±5° C. |
| Comparative Example 1 | $Y(CrMn)O_3 \cdot Y_2O_3$ | | 30 | ±15° C. |

EXAMPLE 10

Figure 12:
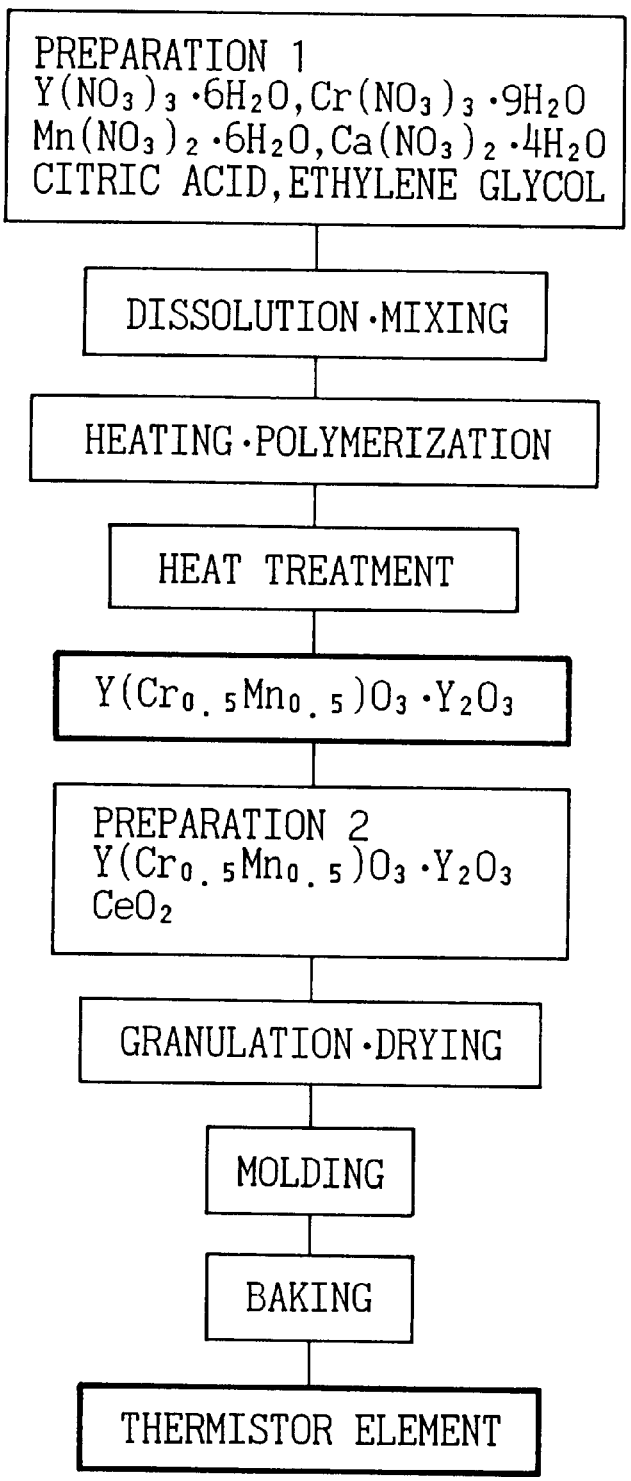
FIG. 12 is a production flowchart of a thermistor element according to Embodiment 10.

In this Example 10, a thermistor element was produced by adding $CeO_2$ as the oxygen occlusion-release composition to the mixed sintered body $aY(Cr_{0.5}Mn_{0.5})O_3 \cdot bY_2O_3$ (a=0.38, b=0.62) in the same way as in Example 2. As can be seen from FIG. 12 showing the production process, the thermistor composition as the raw material of the mixed sintered body was prepared by a liquid phase method in this Example 10.

In the preparation 1 step, the sol particles of $Y(NO_3)_3 \cdot 6H_2O$, $Cr(NO_3)_3 \cdot 9H_2O$ and $Mn(NO_3)_2 \cdot 6H_2O$ each having purity of at least 99.9% and being nitrate of each metal element as the starting powder of the mixed sintered body $Y(Cr_{0.5}Mn_{0.5})O_3 \cdot Y_2O_3$ were prepared and weighed so that the composition after heat treatment (calcination) attained the object composition. Further, 4.5 wt % (on the basis of the mixed sintered body) of $Ca(NO_3)_2 \cdot 4H_2O$ as the raw material of Ca as a sintering assistant component was used. Further, nitric acid as a complex forming agent and ethylene glycol as a polymerization agent were prepared. At this time, citric acid was adjusted in such a manner that its concentration satisfied the relation c/d=4 times equivalent when c was the molar number of citric acid, and d was the value obtained by converting the total amount of each metal element Y, C and Mn in the object composition of the thermistor element. Citric acid was then dissolved in pure water to obtain a citric acid solution.

In the dissolving/mixing step, the starting materials described above and $Ca(NO_3)_2 \cdot 4H_2O$ were added to this citric acid solution, and each metal element ion (ions of Y, Cr, Mn and Ca) and citric acid were allowed to react with each other to form a composite complex compound. To obtain a polymer of the composite complex compound in the subsequent heat/polymerization step, ethylene glycol as the polymerization agent was added, stirred and mixed. The resulting mixed solution was heated at 80 to 95° C. so that the polymerization reaction could proceed. Heating was finished when the polymerization reaction proceeded sufficiently, thereby obtaining a precursor solution of $Y(Cr_{0.5}Mn_{0.5})O_3 \cdot Y_2O_3$ that was a viscous solution. This precursor solution of $Y(Cr_{0.5}Mn_{0.5})O_3 \cdot Y_2O_3$ was charged into a crucible of 99.7% alumina. After drying was done, heat treatment was carried out at 600 to 1,200° C. to obtain a powder of the composition of $aY(Cr_{0.5}Mn_{0.5})O_3 \cdot bY_2O_3$ (a=0.38, b=0.62). The composition was mixed and pulverized to give the thermistor composition.

In the preparation 2 step, the resulting thermistor composition $Y(Cr_{0.5}Mn_{0.5})O_3 \cdot Y_2O_3$ and $CeO_2$ as the oxygen occlusion-release composition were mixed. The same fine powder raw material having purity of at least 99.9% (a product of Kojundo Kagaku K. K.) as that of Example 1 was used for $CeO_2$. The amount of $CeO_2$ was 5 mol % on the basis of the total molar number of $Y(Cr_{0.5}Mn_{0.5})O_3$, $Y_2O_3$ and $CeO_2$. Furthermore, 4.5 wt % of $CaCO_3$ and 3 wt % of $SiO_2$ as sintering assistants were added. Thereafter, granulation, drying and molding were carried out and a thermistor element consisting of $Y(Cr_{0.5}Mn_{0.5})O_3 \cdot Y_2O_3 + CeO_2$ was obtained in the same way as in Example 1.

This thermistor element was assembled to produce a temperature sensor and was evaluated in the same way as in Example 1. Table 2 tabulates the maximum resistance change ratio ΔR, the temperature accuracy after the high temperature continuous durability test and the initial temperature accuracy. As tabulated in Table 2, it could be confirmed that the thermistor element according to Example 10 could stably accomplish the maximum resistance change ratio ΔR of the high level of about 3% to 5%. The temperature accuracy after the high temperature continuous durability test was ±3° C. and the initial temperature accuracy before the durability test was ±3° C., and a thermistor element excellent in reducing-atmosphere-resistance and having high accuracy could be provided.

EXAMPLE 11

Figure 13:
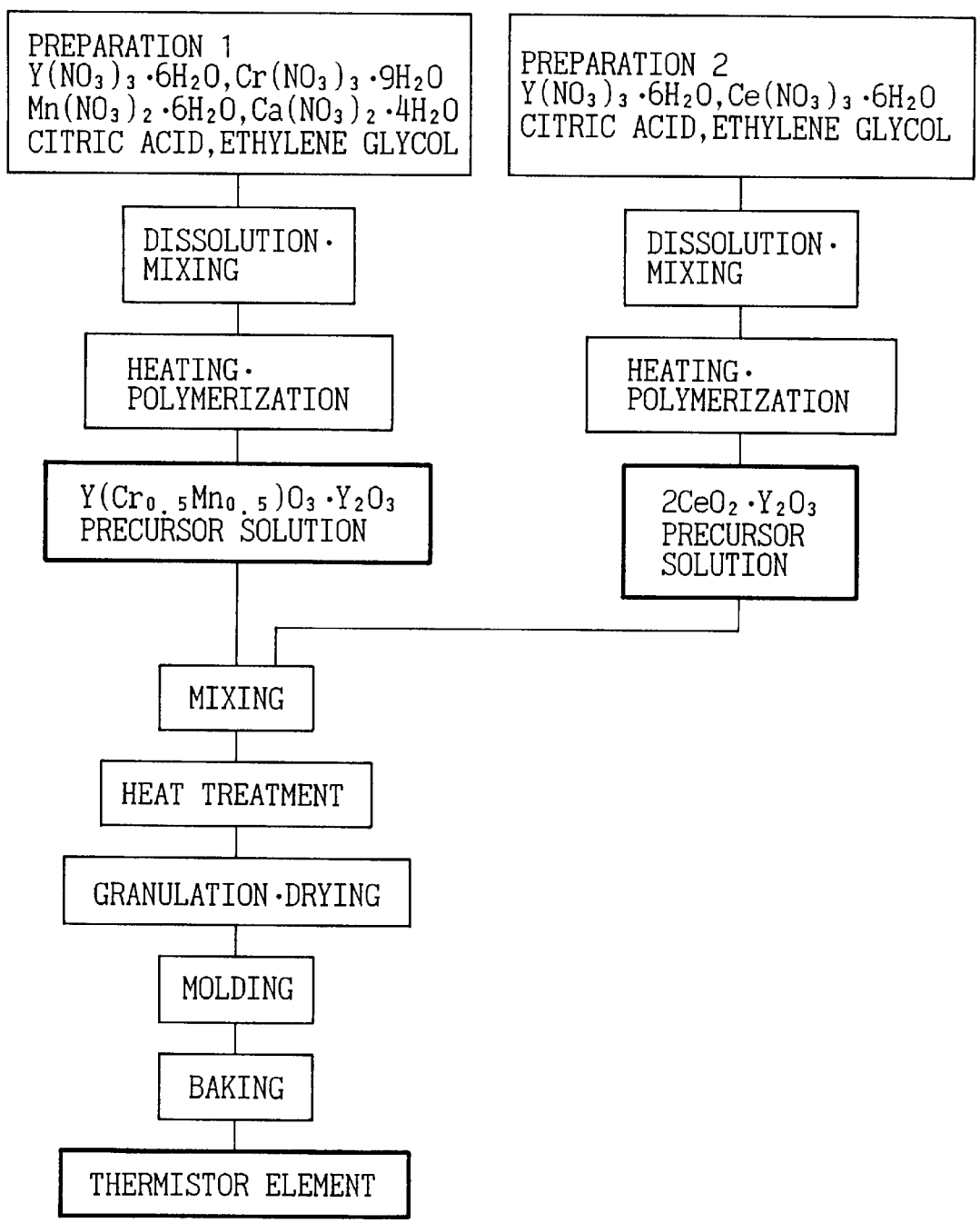
FIG. 13 is a production flowchart of a thermistor element according to Embodiment 11.

In this Example 11, $2CeO_2 \cdot Y2O3$ as used in Example 5 was synthesized from the precursor solution in the same way as in Example 10, and was added and dispersed into the mixed sintered body $aY(Cr_{0.5}Mn_{0.5})O_3 \cdot bY_2O_3$ (a=0.38, b+0.62) to produce a thermistor element. FIG. 13 shows the production process of this Example 11.

In the preparation 1 step, the nitrate of each metal element as the starting material of the composite oxide $Y(Cr_{0.5}Mn_{0.5})O_3$ was heat treated in the same way as in Example 10 and was weighed so as to provide the composition $Y(Cr_{0.5}Mn_{0.5})O_3$. The nitrate of Ca as a sintering assistant was weighed. Further, a citric acid solution as a complex forming agent and ethylene glycol as a polymerization agent were prepared. In the dissolving/mixing step, the starting materials described above and $Ca(NO_3)_3 \cdot 4H_2O$ were added to the citric acid solution and were allowed to react, thereby forming the composite complex compound. In the next heating/polymerization step, ethylene glycol was added and heated so that polymerization reaction could proceed, giving a precursor solution (first precursor solution) of $Y(Cr_{0.5}Mn_{0.5})O_3$ that was a viscous solution.

In the preparation 2 step, to obtain the precursor solution of the oxygen occlusion-release composition $2CeO_2 \cdot Y_2O_3$, nitrates of Ce and Y were prepared. In the dissolving/mixing step, citric acid and each element ion (Ce, Y) were allowed to react to form a composite complex compound of $2CeO_2 \cdot Y_2O_3$. In the heating/polymerization step, ethylene glycol was added and heated so that the polymerization could proceed and a precursor solution (second precursor solution) of $2CeO_2 \cdot Y_2O_3$ could be obtained.

In the subsequent mixing step, the precursor solution of $Y(Cr_{0.5}Mn_{0.5})O_3$ and the precursor solution of $2CeO_2 \cdot Y_2O_3$ were mixed to obtain a mixed precursor solution. After this mixed precursor solution was charged into a crucible made of 99.7% of alumina and was dried, it was heat treated at 600 to 1,200° C. to obtain a composite raw material containing $2CeO_2 \cdot Y_2O_3$ that was dispersed in the thermistor composition $Y(Cr_{0.5}Mn_{0.5})O_3$ (a=0.38, b=0.62). Thereafter, granulation, drying, molding and baking were carried out in the same way to obtain a thermistor element made of $Y(Cr_{0.5}Mn_{0.5})O_3+2CeO_2 \cdot Y_2O_3$.

This thermistor element was assembled to produce a temperature sensor and was evaluated in the same way as in Example 1. Table 2 tabulates the maximum resistance change ratio ΔR, the temperature accuracy after the high temperature continuous durability test and the initial temperature accuracy. As tabulated in Table 2, it could be confirmed that the thermistor element according to Example 11 could stably accomplish the maximum resistance change ratio ΔR of the high level of about 3 to 5%. Temperature accuracy after the high temperature continuous durability test was ±3° C. and initial temperature accuracy before the durability test was ±3° C., and a thermistor element excellent in reducing-atmosphere-resistance and having high accuracy could be provided.

EXAMPLE 12

Figure 14:
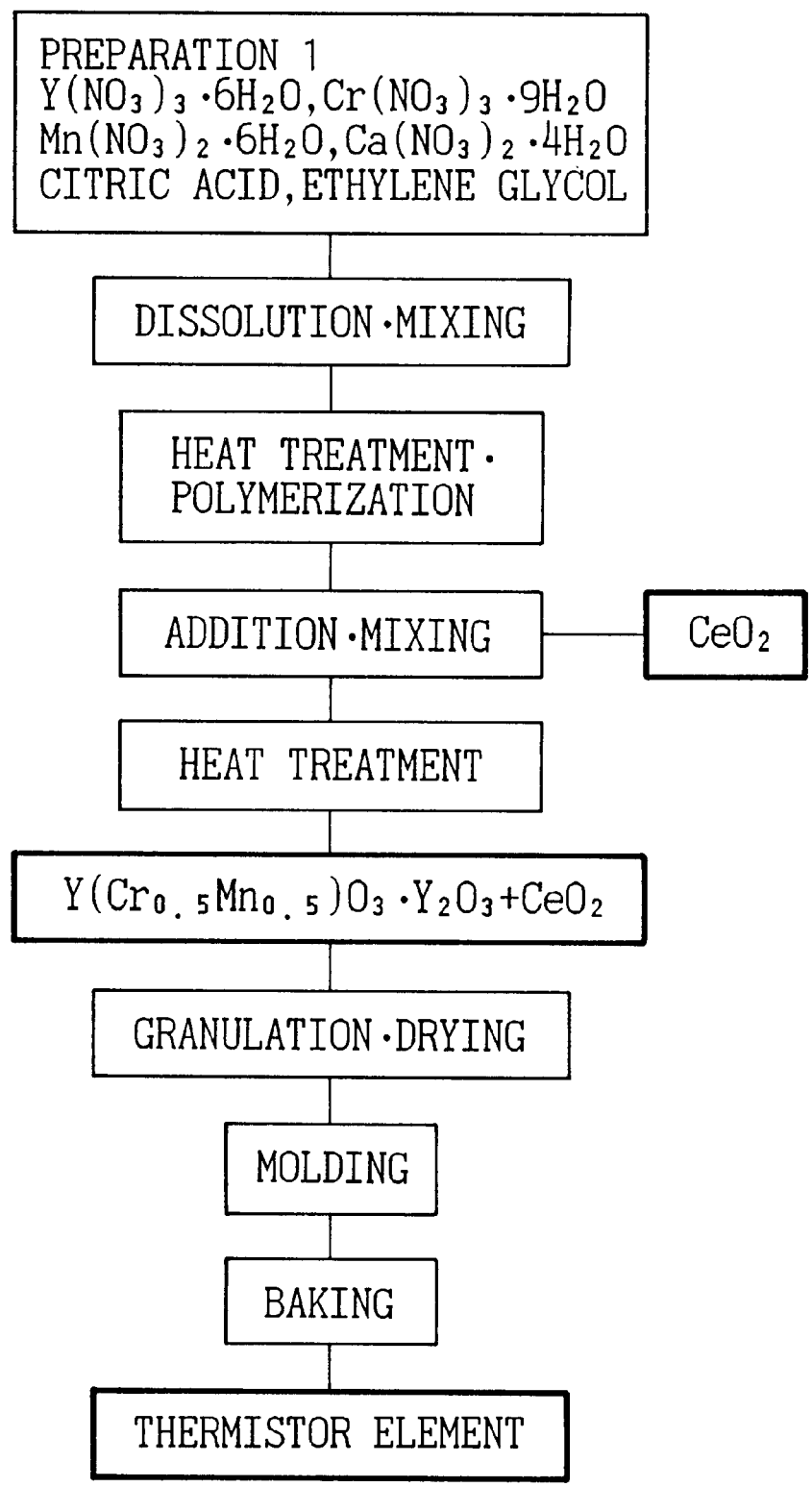
FIG. 14 is a production flowchart of a thermistor element according to Embodiment 12.

On the basis of the production process shown in FIG. 14, a thermistor element was produced by adding and dispersing $CeO_2$ as the oxygen occlusion-release composition into the mixed sintered body $aY(Cr_{0.5}Mn_{0.5})O_3 \cdot bY_2O$ (a=0.38, b=0.62). In this Example 12, a solution containing a precursor compound of the mixed sintered body was synthesized by a liquid phase method, and $CeO_2$ was added to this precursor solution to give a mixed precursor solution.

In the preparation 1 step, a nitrate of each metal element was used as the starting material of the mixed sintered body. Namely, $Y(NO_3)_3 \cdot 6H_2O$, $Cr(NO_3)_3 \cdot 9H_2O$ and $Mn(NO_3)_2 \cdot 6H_2O$ each having purity of at least 99.9% were prepared and weighed so that the composition after heat treatment (calcination) attained the object composition. Further, $Ca(NO_3)_2 \cdot 4H_2O$ as the raw material of Ca as a sintering assistant component was used, and was weighed to 4.5 wt % when calculated as oxide. Further, nitric acid as a complex forming agent and ethylene glycol as a polymerization agent were weighed. At this time, citric acid was weighed in such a manner that its concentration satisfied the relation c/d=4 times equivalent when c was the molar number of citric acid, and d was the value obtained by converting the total amount of each metal element Y, C and Mn in the object composition of the thermistor element to the molar number. Citric acid was then dissolved in pure water to obtain a citric acid solution.

In the dissolving/mixing step, the starting materials described above and $Ca(NO_3)_2 \cdot 4H_2O$ were added to this citric acid solution, and each metal element ion (ions of Y, Cr, Mn and Ca) and citric acid were allowed to react with each other to form a composite complex compound. In the subsequent heat/polymerization step, ethylene glycol as the polymerization agent was added, stirred and mixed. The resulting mixed solution was heated at 80 to 95° C. so that the polymerization reaction could proceed. Heating was finished when the polymerization reaction proceeded sufficiently, thereby obtaining a precursor solution of $Y(Cr_{0.5}Mn_{0.5})O_3 \cdot Y_2O_3$.

In the addition/mixing step, the $CeO_2$ as used in Example 1 was added to, and mixed with, the precursor solution of this $Y(Cr_{0.5}Mn_{0.5})O_3 \cdot Y_2O_3$ in a ratio of 5 mol % on the basis of the total molar number of $Y(Cr_{0.5}Mn_{0.5})O_3$, $Y_2O_3$ and $CeO_2$. The mixed precursor solution of $Y(Cr_{0.5}Mn_{0.5})O_3 \cdot Y_2O_3$ in which $CeO_2$ was sufficiently mixed and dispersed was charged into a crucible of 99.7% alumina. After drying was done, heat treatment was carried out at 600 to 1,200° C. to obtain a powder of the thermistor composition of $Y(Cr_{0.5}Mn_{0.5})O_3 \cdot Y_2O_3$ in which $CeO_2$ as the oxygen occlusion-release composition was mixed and dispersed. This powder was used as the thermistor composite raw material.

Next, granulation, drying, molding and baking of the resulting raw material were carried out in the same way as in Example 1 to obtain a thermistor element made of $Y(Cr_{0.5}Mn_{0.5})O_3 \cdot Y_2O_3+CeO_2$. This thermistor element was assembled to produce a temperature sensor and was evaluated in the same way as in Example 1. Table 1 tabulates the maximum resistance change ratio ΔR, the temperature accuracy after the high temperature continuous durability test and the initial temperature accuracy. As tabulated in Table 1, it could be confirmed that the thermistor element according to Example 7 could stably accomplish the maximum resistance change ratio ΔR at the high level of about 3% to 5%. Temperature accuracy after the high temperature continuous durability test was ±3° C. and initial temperature accuracy before the durability test was ±3° C., and a thermistor element excellent in reduction resistance and having high accuracy could be provided.

EXAMPLE 13

Figure 15:
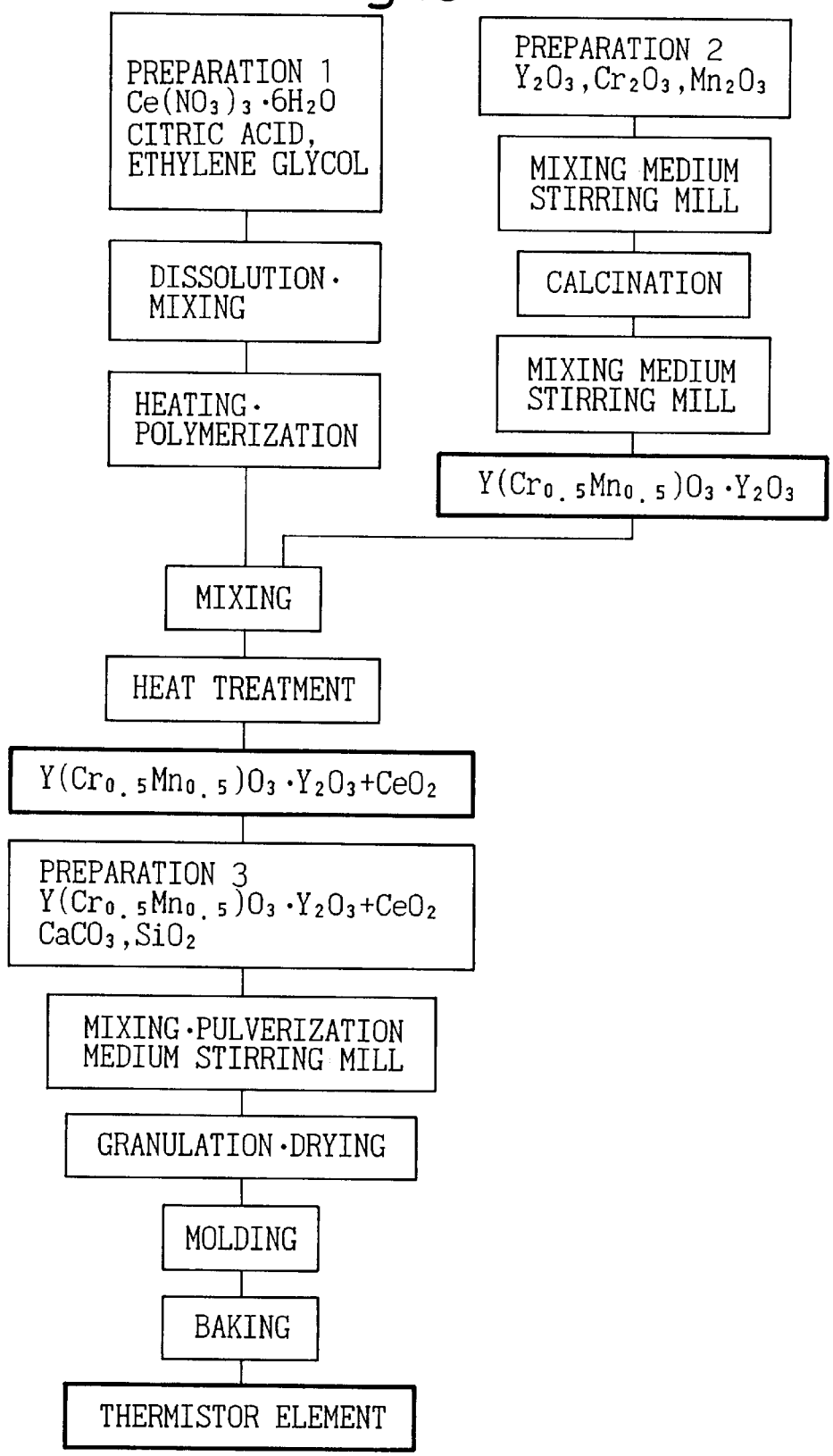
FIG. 15 is a production flowchart of a thermistor element according to Embodiment 13.

On the basis of the production process shown in FIG. 15, a thermistor element was produced by adding and dispersing $CeO_2$ as the oxygen occlusion-release composition into the mixed sintered body $aY(Cr_{0.5}Mn_{0.5})O_3 \cdot bY_2O$ (a=0.40, b=0.60) to produce a thermistor element. In this Example 13, oxide powder was used as the starting materials of the mixed sintered body while a precursor solution of $CeO_2$ was prepared by a liquid phase method.

In the preparation 1 step, a nitrate $Ce(NO_3)_3 \cdot 6H_2O$ having purity of at least 99.9% was prepared as the starting material of $CeO_2$. Thereafter, the starting material was dissolved and mixed with a citric acid solution in the same way as in Example 10 to obtain a complex compound. After ethylene glycol as a polymerization agent was added, stirred and mixed, heating was carried out at 80 to 95° C. to allow the polymerization reaction to proceed. Heating was finished at the point at which the polymerization reaction proceeded sufficiently, and a precursor solution of $CeO_2$ was obtained.

In the preparation 2 step, oxide powder of each metal element was used. Namely, $Y_2O_3$, $Cr_2O_3$ and $Mn_2O_3$ each having purity of at least 99.9% were prepared, heat treated and then weighed so as to achieve the object composition described above. The mixing step and the calcining step were carried out in the same way as in Example 1, and a raw material composition of $aY(Cr_{0.5}Mn_{0.5})O_3 \cdot bY_2O$ (a=0.40, b=0.60) was obtained. The resulting composition was roughly pulverized by a chaser mill, passed through a 500 μm sieve, similarly calcined (heat treated), and pulverized by use of a medium stirring mill to give a pulverized slurry of the thermistor composition.

In the next mixing step, the pulverized slurry of the thermistor composition was added to, and mixed with, the precursor solution of $CeO_2$ described above by use of the medium stirring mill to obtain a mixed precursor solution in which the thermistor composition was dispersed. This precursor solution was charged into a crucible of 99.7% alumina. After drying was made, heat treatment was carried out at 600 to 1,200° C. to give powder of the thermistor composition of $Y(Cr_{0.5}Mn_{0.5})O_3 \cdot Y_2O_3$ in which $CeO_2$ as the oxygen occlusion-release composition was mixed and dispersed. This powder was used as the thermistor composite raw material.

In the preparation 3 step, 4.5 wt % of $CaCO_3$ and 3 wt % of $SiO_2$ as sintering assistants were added to the resulting thermistor composite raw material. After mixing and pulverization were carried out by use of the medium stirring mill, granulating, drying, molding and baking were carried out in the same way as in Example 1 to obtain a thermistor element made of $Y(Cr_{0.5}Mn_{0.5})O_3 \cdot Y_2O + CeO_2$. This thermistor element was assembled to produce a temperature sensor and was evaluated in the same way as in Example 1. Table 1 tabulates the maximum resistance change ratio $\Delta R$, temperature accuracy after the high temperature continuous durability test and initial temperature accuracy. As tabulated in Table 3, it could be confirmed that the thermistor element according to Example 12 could stably accomplish the maximum resistance change ratio $\Delta R$ of the high level of about 3 to 5%. The temperature accuracy after the high temperature continuous durability test was ±5° C. and the initial temperature accuracy before the durability test was ±5° C., and a thermistor element excellent in reducing-atmosphere-resistance and having high accuracy could be provided.

Comparative Example 1

For comparison, a thermistor element made of the mixed sintered body $aY(Cr_{0.5}Mn_{0.5})O_3 \cdot bY_2O$ (a=0.38, b=0.62) was produced by using the same raw material powder as that of Example 1 as the starting materials in the same way as in Example 1 with the exception that the oxygen occlusion-release composition $CeO_2$ was not added.

In the preparation 1 step, oxide powder of $Y_2O_3$, $Cr_2O_3$ and $Mn_2O_3$ powder having purity of at least 99.9% as an oxide of each metal element were prepared as the starting powder. After heat treatment, each powder was weighed so that the composition after heat treatment (calcination) attained the object composition. The composition was pulverized roughly by use of a chaser mill and was passed through a 200 μm sieve. In the preparation 2 step, 4.5 wt % of $CaCO_3$ and 3 wt % of $SiO_2$ were added as sintering assistants, and mixing and pulverization were carried out. Thereafter, granulation, drying and baking were carried out by use of a medium stirring mill in the same way as in Example 1 to obtain a thermistor element made of $aY(Cr_{0.5}Mn_{0.5})O_3 \cdot bY_2O$ (a=0.38, b=0.62).

This thermistor element was assembled to produce a temperature sensor and was evaluated in the same way as in Example 1. Table 2 tabulates the maximum resistance change ratio $\Delta R$, temperature accuracy after the high temperature continuous durability test and initial temperature accuracy. As a result, the maximum resistance change ratio $\Delta R$ was as great as about 30%, and the temperature accuracy after the high temperature continuous durability test deteriorated to ±15° C. with respect to initial temperature accuracy before the durability test of ±5° C. Consequently, this thermistor element to which the oxygen occlusion-release composition was not added had a large maximum resistance change ratio $\Delta R$, and a high accuracy temperature sensor having stable resistance value characteristics could not be acquired.

EXAMPLES 14 to 19 and Comparative Examples 2 and 3

An oxygen occlusion-release composition $CeO_2$ was added to, and mixed with, a mixed sintered body $aY(Cr_{0.5}Mn_{0.5})O_3 \cdot bY_2O$ (a=0.38, b=0.62) in the same way as in Example 2 to produce a thermistor element. At this time, the addition amount of $CeO_2$ was changed within the range of 1 mol % to 95 mol % as tabulated in Table 3 (Examples 14 to 19). For comparison, thermistor elements having the addition amount of $CeO_2$ of 97 mol % and 0.5 mol %, respectively, were produced in the same way as Comparative Examples 2 and 3.

Each of the thermistor elements was assembled to produce a temperature sensor and was evaluated in the same way as in Example 1. Table 3 tabulates the maximum resistance change ratio $\Delta R$, the temperature accuracy after the high temperature continuous durability test and the initial temperature accuracy. As tabulated in Table 3, it could be confirmed that the thermistor elements of Examples 14 to 19, in which the addition amount of $CeO_2$ was within the range of 1 mol % to 95 mol %, could stably provide a level of 3 to 10% of the maximum resistance change ratio $\Delta R$. The temperature accuracy after the high temperature continuous durability test was ±5° C. and the initial temperature accuracy before the durability test was ±5° C., and a thermistor element excellent in reducing-atmosphere resistance and having high accuracy could be provided.

In contrast, the thermistor element of Comparative Example 2 had a large resistance value of 500 kΩ and could not be used as a thermistor. The thermistor element of Comparative Example 3 had a maximum resistance change ratio $\Delta R$ of as great as 20 to 30%, and temperature accuracy after the high temperature continuous durability test was ±20° C. and was deteriorated with respect to initial temperature accuracy ±5° C. before the durability test. It could be understood from above that the addition amount of the oxygen occlusion-release composition was desirably selected from the range of 1 mol % to 95 mol %.

TABLE 3

| | Composition ratio (Mol %) | | | resistance value | maximum resistance | temperature accuracy after durability test at 1100° C. for 1000 hrs. |
|---|---|---|---|---|---|---|
| | Y(CrMn)O₃ | Y2O3 | CeO₂ | (27° C.) | change ratio (%) | (N = 100, ±6σ) |
| Example 2 | 38 | 57 | 5 | 30KΩ | 3–5 | ±5° C. |
| Example 14 | 39.6 | 59.4 | 1 | 30KΩ | 5–10 | ±6° C. |
| Example 15 | 39.2 | 58.8 | 2 | 30KΩ | 3–5 | ±5° C. |
| Example 16 | 36 | 54 | 10 | 31KΩ | 3–5 | ±5° C. |
| Example 17 | 32 | 48 | 20 | 31KΩ | 3–5 | ±5° C. |
| Example 18 | 20 | 30 | 50 | 32KΩ | 3–5 | ±5° C. |
| Example 19 | 2 | 3 | 95 | 100KΩ | 3–5 | ±5° C. |
| Comparative Example 2 | 1.2 | 1.8 | 97 | 500KΩ | not used as a thermistor | |
| Comparative Example 3 | 39.8 | 59.7 | 0.5 | 30KΩ | 20–30 | ±20° C. |

As described above, because the oxygen occlusion-release composition is added to, and dispersed in, the reducing-atmosphere-resistant thermistor element according to the present invention, the thermistor element can restrict a fluctuation in the composition in the reducing atmosphere, and can suppress reduction of the thermistor element and a resistance change. Therefore, the present invention provides a high precision thermistor element that does not need thermal aging for stabilizing the element resistance, and the precious case of a metal material, that have been necessary in the past, and is economical, has a small resistance change ratio $\Delta R$ and exhibits stable characteristics.

What is claimed is:

1. A reducing-atmosphere-resistant thermistor element consisting of a metal oxide sintered body as a principal component, characterized by having a structure in which an oxygen occlusion-release composition having oxygen occlusion-release characteristics is dispersed in said metal oxide sintered body; wherein a starting material of said oxygen occlusion-release composition is in the form of ultra-fine particles having a mean particle diameter of not greater than 100 nm.

2. A reducing-atmosphere-resistant thermistor element according to claim 1, wherein said oxygen occlusion-release composition is an oxide containing at least one metal oxide selected from the group consisting of Ce, Pr and Tb.

3. A reducing-atmosphere-resistant thermistor element according to claim 2, wherein said oxygen occlusion-release composition is at least one oxide selected from the group consisting of $CeO_2$, $Pr_6O_{11}$, $Tb_4O_7$, $2CeO_2 \cdot Y_2O_3$ and $CeO_2 \cdot ZrO_2$.

4. A reducing-atmosphere-resistant thermistor element according to claim 1, wherein an addition amount of said oxygen occlusion-release composition is 1 to 95 mol % on the basis of the total molar amount (100%) of said metal oxide sintered body and said oxygen occlusion-release composition.

5. A reducing-atmosphere-resistant thermistor element according to claim 1, wherein said metal oxide sintered body has negative thermistor characteristics.

6. A reducing-atmosphere-resistant thermistor element according to claim 5, wherein said metal oxide sintered body is a mixed sintered body (M1 M2)$O_3 \cdot AO_x$ of a composite oxide expressed by (M1 M2)$O_3$ and a metal oxide expressed by $AO_x$, M1 in said composite oxide (M1 M2)$O_3$ is at least one kind of element selected from the group consisting of the Group 2A and the Group 3A with the exception of La of the Periodic Table, M2 is at least one kind of element selected from the group consisting of the Groups 3B, 4A, 5A, 6A, 7A and 8, said metal oxide $AO_x$ has a melting point of not lower than 1,400° C., and a resistance value (at 1,000° C.) of the $AO_x$ single substance is at least 1,000$\Omega$ in a thermistor form.

7. A reducing-atmosphere-resistant thermistor element according to claim 5, wherein, when a molar fraction of said composite oxide (M1 M2)$O_3$ in said mixed sintered body is a and a molar fraction of said metal oxide $AO_x$ is b, a and b satisfy the relation $0.05 \leq a < 1.0$, $0 < b \leq 0.95$ and $a+b=1$.

8. A reducing-atmosphere-resistant thermistor element according to claim 6, wherein M1 in said composite oxide (M1 M2)$O_3$ is at least one kind of element selected from the group Mg, Ca, Sr, Ba, Y, Ce, Pr, Nd, Sm, Eu, Gd, Tb, Dy, Ho, Yb and Sc, and M2 is at least one kind of element selected from the group consisting of Al, Ga, Ti, Zr, Hf, V, Nb, Ta, Cr, Mo, W, Mn, Tc, Re, Fe, Go, Ni, Ru, Rh, Pd, Os, Ir and Pt.

9. A reducing-atmosphere-resistant thermistor element according to claim 6, wherein A in said metal oxide $AO_x$ is at least one kind of element selected from the group consisting of B, Mg, Al, Si, Ca, Sc, Ti, Cr, Mn, Fe, Ni, Zn, Ga, Ge, Sr, Y, Zr, Nb, Sn, Ce, Pr, Nd, Sm, Eu, Gd, Tb, Dy, Ho, Er, Tm, Yb, Lu, Hf and Ta.

10. A reducing-atmosphere-resistant thermistor element according to claim 9, wherein said metal oxide $AO_x$ is at least one kind of metal oxide selected from the group consisting of MgO, $Al_2O_3$, $Sc_2O_3$, $TiO_2$, $Cr_2O_3$, MnO, $Mn_2O_3$, $Fe_2O_3$, $Fe_3O_4$, NiO, ZnO, $Ga_2O_3$, $Y_2O_3$, $ZrO_2$, $Nb_2O_5$, $SnO_2$, $CeO_2$, $Pr_2O_3$, $Nd_2O_3$, $Sm_2O_3$, $Eu_2O$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $HfO_2$, $Ta_2O_5$, $2MgO \cdot 2SiO_2$, $MgSiO_3$, $MgCr_2O_4$, $MgAl_2O_4$, $CaSiO_3$, $YAlO_3$, $Y_3Al_5O_{12}$, $Y_2SiO_5$ and $Al_2O_3 \cdot 2SiO_2$.

11. A reducing-atmosphere-resistant thermistor element according to claim 6, wherein M1 in said composite oxide (M1 M2)$O_3$ is Y, M2 is Cr and Mn, A in said metal oxide $AO_x$ is Y, and said mixed sintered body (M1 M2)$O_3 \cdot AO_x$ is Y(CrMn)$O_3 \cdot Y_2O_3$.

12. A reducing-atmosphere-resistant thermistor element according to claim 1, which further contains at least one of CaO, $CaCO_3$, $SiO_2$ and $CaSiO_3$ as a sintering assistant.

13. A temperature sensor comprising said reducing-atmosphere-resistant thermistor according to claim 1.

14. A method of producing a reducing-atmosphere-resistant thermistor element, consisting of a metal oxide sintered body as a principal component, comprising the steps of:

mixing and pulverizing raw material powder containing said metal, heat treating the mixture and obtaining a thermistor composition made of an oxide containing said metal;

mixing and pulverizing said thermistor composition and an oxygen occlusion-release composition having oxygen occlusion-release characteristics to prepare a composite raw material containing said oxygen occlusion-release composition dispersed in said thermistor composition; and molding said composite raw material into a predetermined shape and baking the resulting molded article;

wherein said raw material powder is in the form of a powder having a mean particle diameter of not greater than 100 nanometers.

15. A reducing-atmosphere-resistant thermistor element according to claim 14, wherein said oxygen occlusion-release composition or its starting raw material is in the form of ultra-fine particles having a mean particle diameter of not greater than 100 nanometers.

16. A method of producing a reducing-atmosphere-resistant thermistor element, consisting of a metal oxide sintered body as a principal component, comprising the steps of:

mixing a precursor compound of said metal oxide into a liquid phase to prepare a precursor solution, heat treating said precursor solution and obtaining a thermistor composition containing said metal oxide;

mixing and pulverizing said thermistor composition and an oxygen occlusion-release composition having oxygen occlusion-release characteristics to prepare a composite raw material containing said oxygen occlusion-release composition dispersed in said thermistor composition; and molding said composite raw material into a predetermined shape and baking the resulting molded article.

17. A method of producing a reducing-atmosphere-resistant thermistor element, consisting of a metal oxide sintered body as a principal component, comprising the steps of:

mixing a precursor compound of said metal oxide into a liquid phase and preparing a first precursor solution;

mixing a precursor compound of an oxygen occlusion-release composition having oxygen occlusion-release characteristics into a liquid phase and preparing a second precursor solution;

mixing said first and second precursor solutions and preparing a mixed precursor solution of said metal oxide and said oxygen occlusion-release composition;

heat treating said mixed precursor solution and preparing a composite raw material containing said oxygen occlusion-release composition dispersed in said thermistor composition containing said metal oxide; and molding said composite raw material into a predetermined shape and baking the resulting molded article.

18. A method of producing a reducing-atmosphere-resistant thermistor element, consisting of a metal oxide sintered body as a principal component, comprising the steps of:

mixing a precursor compound of said metal oxide into a liquid phase to prepare a precursor solution, mixing an oxygen occlusion-release composition having oxygen occlusion-release characteristics into said precursor solution and preparing a mixed precursor solution containing said oxygen occlusion-release composition dispersed therein;

heat treating said mixed precursor solution and preparing a composite raw material containing said oxygen occlusion-release composition dispersed in said thermistor composition containing said metal oxide; and molding said composite raw material into a predetermined shape and baking the resulting molded article.

19. A method of producing a reducing-atmosphere-resistant thermistor element, consisting of a metal oxide sintered body as a principal component, comprising the steps of:

obtaining a mixture by mixing and pulverizing raw material powder containing said metal;

causing said mixture to be impregnated with a precursor solution of an oxygen occlusion-release composition having oxygen occlusion-release characteristics;

heat treating said mixture impregnated with the precursor solution of said oxygen occlusion-release composition and preparing a composite raw material containing said oxygen occlusion-release composition dispersed in said thermistor composition containing said metal oxide; and molding said composite material into a predetermined shape and baking the resulting molded article.

\* \* \* \* \*